United States Patent
Bink et al.

(10) Patent No.: US 12,551,704 B2
(45) Date of Patent: Feb. 17, 2026

(54) ENVIRONMENT-RESPONSIVE NEUROSTIMULATION PAIN THERAPY OPTIMIZATION

(71) Applicant: Medtronic, Inc., Minneapolis, MN (US)

(72) Inventors: Hank T. Bink, Golden Valley, MN (US); Erik J. Peterson, Fridley, MN (US); Jiashu Li, Mounds View, MN (US); Vinod Sharma, Maple Grove, MN (US); Juan G. Hincapie, Maple Grove, MN (US); Eric J. Panken, Edina, MN (US); Leonid M. Litvak, Beit Shemesh (IL); David A. Dinsmoor, North Oaks, MN (US); Todd D. Zenisek, Georgetown, TX (US); Andrew L. Schmeling, Holmen, WI (US); Andrew J. Cleland, St. Paul, MN (US)

(73) Assignee: Medtronic, Inc., Minneapolis, MN (US)

( * ) Notice: Subject to any disclaimer, the term of this patent is extended or adjusted under 35 U.S.C. 154(b) by 316 days.

(21) Appl. No.: 18/304,816

(22) Filed: Apr. 21, 2023

(65) Prior Publication Data

US 2023/0364425 A1 Nov. 16, 2023

Related U.S. Application Data

(60) Provisional application No. 63/364,608, filed on May 12, 2022, provisional application No. 63/364,610, (Continued)

(51) Int. Cl.
*A61N 1/36* (2006.01)
*A61M 5/172* (2006.01)
(Continued)

(52) U.S. Cl.
CPC ....... *A61N 1/36139* (2013.01); *A61M 5/1723* (2013.01); *A61N 1/025* (2013.01);
(Continued)

(58) Field of Classification Search
CPC .............. A61N 1/36139; A61N 1/3601; A61N 1/36071; A61N 1/37258; A61N 1/3614;
(Continued)

(56) References Cited

U.S. PATENT DOCUMENTS

| 6,937,900 B1 | 8/2005 | Pianca et al. |
| 8,423,145 B2 | 4/2013 | Pless et al. |

(Continued)

FOREIGN PATENT DOCUMENTS

WO 2011146393 A1 11/2011

OTHER PUBLICATIONS

Hell et al., "Deep Brain Stimulation Programming 2.0: Future Perspectives for Target Identification and Adaptive Closed Loop Stimulation," Frontiers in Neurology, Apr. 2019, 20 pp.

(Continued)

*Primary Examiner* — Paula J Stice
(74) *Attorney, Agent, or Firm* — Shumaker & Sieffert, P.A.

(57) ABSTRACT

Processing circuitry of a system configured to determine a patient state based on sensed signals including posture and activity information and control delivery of electrical stimulation therapy to the patient via electrodes implanted proximal to target tissue of the patient. The sensed signals also include impedance measurement, and other bioelectrical signals, where sensing is interleaved with the electrical stimulation therapy. Responsive to determining the patient state, select an action, wherein the selected action comprises one or more of: store collected information, upload the (Continued)

collected information to an external computing device, and output an electronic signal comprising an alert.

20 Claims, 7 Drawing Sheets

Related U.S. Application Data filed on May 12, 2022, provisional application No. 63/364,606, filed on May 12, 2022.

(51) Int. Cl.
*A61N 1/02* (2006.01)
*A61N 1/05* (2006.01)
*A61N 1/372* (2006.01)

(52) U.S. Cl.
CPC ......... *A61N 1/0551* (2013.01); *A61N 1/3601* (2013.01); *A61N 1/36071* (2013.01); *A61N 1/36078* (2013.01); *A61N 1/37258* (2013.01); *A61M 2205/054* (2013.01); *A61N 1/3614* (2017.08); *A61N 1/37288* (2013.01)

(58) Field of Classification Search
CPC ............. A61N 1/3611; A61N 1/36535; A61M 5/1723; A61M 2205/054; A61B 5/0816; A61B 5/686
See application file for complete search history.

(56) References Cited

U.S. PATENT DOCUMENTS

| | | |
|---|---|---|
| 8,588,929 B2 | 11/2013 | Skelton et al. |
| 8,731,656 B2 | 5/2014 | Bourget et al. |
| 8,825,175 B2 | 9/2014 | King |
| 9,119,965 B2 | 9/2015 | Xi et al. |
| 9,669,219 B2 | 6/2017 | Caparso et al. |
| 2013/0150918 A1 | 6/2013 | Peterson et al. |
| 2017/0326371 A1 | 11/2017 | Arcot-Krishnamurthy et al. |
| 2019/0336772 A1 | 11/2019 | Kim et al. |
| 2021/0008371 A1 | 1/2021 | Annecchino |
| 2021/0023300 A1 | 1/2021 | Osorio |
| 2021/0100998 A1 | 4/2021 | Charlesworth et al. |

OTHER PUBLICATIONS

Schultz et al., "Sensor-Driven Position-Adaptive Spinal Cord Stimulation for Chronic Pain," Pain Physician, vol. 15, No. 1, Jan.-Feb. 2012, 12 pp.

Sun et al., "Closed-Loop Neurostimulation: The Clinical Experience," Neurotherapeutics, vol. 11, No. 3, Jul. 2014, pp. 553-563.

ENVIRONMENT-RESPONSIVE NEUROSTIMULATION PAIN THERAPY OPTIMIZATION

This Application claims the benefit of U.S. Provisional Patent Application 63/364,610, filed 12 May 2022, U.S. Provisional Patent Application 63/364,606, filed 12 May 2022, and of U.S. Provisional Patent Application 63/364,608, filed 12 May 2022, the entire content of each is incorporated herein by reference.

TECHNICAL FIELD

The disclosure relates implantable medical devices.

BACKGROUND

Wearable medical devices may be worn externally, such as on a belt loop, straps, or adhesive, or may be implanted in a patient. Wearable devices may include a battery to power the device, which may need to be periodically charged or replaced. In the example of an implanted device, the patient requires surgery to remove and replace the device with a new device and fresh battery. Rechargeable devices may be recharged with a device including a coil and electronics to monitor and control the recharging, as well as communicate with the medical device. For medical devices configured to deliver therapy to reduce pain, the medical device may deliver electrical stimulation signals, such as a series of electrical current pulses, through electrodes placed on leads implanted near nerves, such as near the spinal cord. Each patient may require a different magnitude, frequency, and other stimulation characteristics based on the patient physiology, patient sensitivity as well as based on the type of device, electrodes, and where the electrodes sit relative to the affected nerve channel.

SUMMARY

In general, the disclosure describes medical devices configured to use data collected from a patient and patient's environment to determine therapy for patient's current situation and adjust the delivered neurostimulation, adjust the delivery of other therapy such as drug delivery, or take some other action based on the collected data. Collected data may include physiological data (e.g., ECAPs, heart rate, body temperature, blood pressure, etc.) and data about the patient's environment (e.g., data based on an accelerometer, mobile phone data, acoustic sensor, etc.). Adjusting the therapy may include changing stimulation settings including pulse width, frequency, electrode selection, combination of waveforms, cycling settings, closed-loop algorithm parameters, and so on. The processing circuitry of the medical device may determine a selected action based on data input, e.g., adjust therapy, via simple classification or more complicated machine learning methods. In some examples, a processor in an implantable (or wearable) medical device may perform the data collection and analysis. In other examples, a processor external to the implantable medical device, e.g., an external computing device such as a programmer, or cloud based server, may perform the collection and analysis.

In one example, this disclosure describes an implantable medical device comprising: a memory configured to store sensed signals; one or more sensor configured to determine posture and activity information of the patient for storage as part of the sensed signals; stimulation circuitry configured to deliver electrical stimulation to the patient via a first set of a plurality of electrodes configured to be implanted proximal to a spinal cord of the patient; sensing circuitry configured to sense electrical signals via a second set of electrodes for storage as part of the sensed signals; and processing circuitry operably coupled to the memory, the processing circuitry configured to: receive the sensed signals, wherein the received sensed signals comprise: the electrical signals sensed via the second set of plurality of electrodes, and the posture and activity information determined by the one or more sensor; determine a degree of distraction of the patient based on the sensed signals; responsive to determining the degree of distraction, control the stimulation circuitry to adjust the electrical stimulation to the patient.

In another example, this disclosure describes a system comprising: an implantable lead comprising: a plurality of electrodes, the lead configured to be implanted proximal to a spinal cord of a patient; and an implantable medical device, the device comprising: a memory configured to store sensed signals; one or more sensor configured to determine posture and activity information of the patient for storage as part of the sensed signals; stimulation circuitry configured to deliver electrical stimulation to the patient via one or more electrodes of the plurality of electrodes; and processing circuitry operably coupled to the memory, the processing circuitry configured to: receive the sensed signals, wherein the received sensed signals comprise: electrical signals sensed via one or more electrodes of the plurality of electrodes, and posture and activity information determined by the one or more sensor; determine a degree of distraction of the patient based on the received sensed signals; responsive to determining the degree of distraction, control the stimulation circuitry to adjust the electrical stimulation to the patient.

In another example, this disclosure describes a method for operating an implantable medical device comprising: receiving, by processing circuitry located within a housing of the medical device, sensed signals, wherein the sensed signals comprise: electrical signals received by sensing circuitry via one or more electrodes of a plurality of electrodes on an implantable lead coupled to the implantable medical device, the lead configured to be implanted such that the plurality of electrodes are proximal to a spinal cord of a patient; and signals indicative of patient posture and patient activity information from one or more sensor located within the housing of the implantable medical device; determining, by the processing circuitry, a degree of distraction of the patient based on the sensed signals; responsive to determining the degree of distraction, controlling, by the processing circuitry, stimulation circuitry to adjust electrical stimulation to the patient based on the degree of distraction, wherein the stimulation circuitry is configured to deliver electrical stimulation to the patient via the plurality of electrodes.

In one example, this disclosure describes an implantable medical device comprising: a memory configured to store sensed signals; one or more sensor configured to determine posture and activity information of the patient for storage as part of the sensed signals; stimulation circuitry configured to deliver electrical stimulation to a patient via a first set of a plurality of electrodes implanted proximal to a spinal cord of the patient; sensing circuitry configured to sense electrical signals via a second set of electrodes for storage as part of the sensed signals; and processing circuitry operably coupled to the memory, the processing circuitry configured to: receive the sensed signals, wherein the sensed signals comprise: electrical signals via one or more electrodes of the plurality of electrodes, and the posture and activity information determined by the one or more sensor; determine respiration activity of the patient based on the sensed signals; determine a degree of distress of the patient based on the sensed signals and the determined respiration activity; responsive to determining the degree of distress, output a command signal.

In another example, this disclosure describes a system comprising: an implantable lead with a plurality of electrodes, the lead configured to be implanted proximal to a spinal cord of a patient; and an implantable medical device, the device comprising: a memory configured to store sensed signals; one or more sensor configured to determine posture and activity information of the patient for storage as part of the sensed signals; stimulation circuitry configured to deliver electrical stimulation to the patient via the plurality of electrodes; sensing circuitry configured to sense electrical signals the plurality of electrodes for storage as part of the sensed signals; and processing circuitry operably coupled to the memory, the processing circuitry configured to: receive the sensed signals, wherein the sensed signals comprise: the electrical signals sensed via one or more electrodes of the plurality of electrodes, and the posture and activity information determined by the one or more sensor; determine respiration activity of the patient based on the sensed signals; determine a degree of distress of the patient based on the sensed signals and the determined respiration activity; responsive to determining the degree of distress, output a command signal.

In another example, this disclosure describes a method for operating an implantable medical device comprising: receiving, by processing circuitry located within a housing of the medical device, sensed signals, wherein the sensed signals comprise: electrical signals received by sensing circuitry via one or more electrodes of a plurality of electrodes on an implantable lead coupled to the implantable medical device, the lead configured to be implanted such that the electrodes are proximal to a spinal cord of a patient; and signals indicative of patient posture and patient activity information from one or more sensor located within the housing of the implantable medical device; storing the sensed signals at a memory device operatively coupled to the processing circuitry; determining respiration activity of the patient based on the sensed signals; determining a degree of distress of the patient based on the sensed signals and the determined respiration activity; responsive to determining the degree of distress, outputting, by the processing circuitry, a command signal.

In one example, this disclosure describes an implantable medical device comprising: a memory configured to store sensed signals; one or more sensor configured to determine posture and activity information of a patient for storage as part of the sensed signals; stimulation generation circuitry configured to deliver electrical stimulation therapy to the patient via first set of a plurality of electrodes configured to be implanted proximal to a spinal cord of the patient; sensing circuitry configured to sense electrical signals via a second set of electrodes for storage as part of the sensed signals; and processing circuitry operably coupled to the memory, the processing circuitry configured to: control the stimulation generation circuitry to deliver the electrical stimulation therapy to a patient: interleaved with the electrical stimulation therapy, control the stimulation generation circuitry to output an impedance measurement signal; receive electrical signals via selected electrodes of the second set of electrodes indicating an impedance between the selected electrodes, determine respiration of the patient based on the impedance; and responsive to determining the respiration of the patient, determine a patient state based on the determined respiration, and the posture and activity information of the patient, responsive to determining the patient state, select an action, wherein the selected action comprises one or more of: store collected information, upload the collected information to an external computing device, and output an electronic signal comprising an alert; and perform the selected action.

In another example, this disclosure describes a system comprising a lead with a plurality of electrodes, the lead configured to be implanted proximal to a spinal cord of a patient; and an implantable medical device, the device comprising: an implantable lead comprising: a memory configured to store sensed signals; one or more sensor configured to determine posture and activity information of a patient for storage as part of the sensed signals; stimulation generation circuitry configured to deliver electrical stimulation therapy to the patient via a plurality of electrodes; sensing circuitry configured to sense electrical signals via the plurality of electrodes for storage as part of the sensed signals; and processing circuitry operably coupled to the memory, the processing circuitry configured to: control the stimulation generation circuitry to deliver the electrical stimulation therapy to a patient: interleaved with the electrical stimulation therapy, control the stimulation generation circuitry to output an impedance measurement signal; receive electrical signals via selected electrodes of the plurality of electrodes indicating an impedance between the selected electrodes, determine respiration of the patient based on the impedance; and responsive to determining the respiration of the patient, determine a patient state based on the determined respiration, and the posture and activity information of the patient, responsive to determining the patient state, select an action, wherein the selected action comprises one or more of: store collected information, upload the collected information to an external computing device, output an electronic signal comprising an alert; and perform the selected action.

In another example, this disclosure describes a method for operating an implantable medical device comprising: receiving, by processing circuitry located within a housing of the medical device, sensed signals, wherein the sensed signals comprise: electrical signals received by sensing circuitry via one or more electrodes of a plurality of electrodes on an implantable lead coupled to the implantable medical device, wherein the lead is configured to be implanted such that the electrodes are proximal to a spinal cord of a patient; and signals indicative of patient posture and patient activity information from one or more sensor located within the housing of the implantable medical device; controlling, by the processing circuitry, the stimulation generation circuitry to deliver electrical stimulation therapy to a patient: controlling, by the processing circuitry, the stimulation generation circuitry to output an impedance measurement signal interleaved with the electrical stimulation therapy; receiving, by the processing circuitry, electrical signals via selected electrodes of the plurality of electrodes indicating an impedance between the selected electrodes, determining, by the processing circuitry, respiration of the patient based on the indicated impedance; and responsive to determining the respiration of the patient, determining, by the processing circuitry, a patient state based on the determined respiration, and the posture and activity information of the patient, responsive to determining the patient state, selecting an action, wherein the selected action comprises one or more of: storing collected information, uploading the collected information to an external computing device, and outputting an electronic signal comprising an alert; and performing the selected action.

The details of one or more examples of the disclosure are set forth in the accompanying drawings and the description below. Other features, objects, and advantages of the disclosure will be apparent from the description and drawings, and from the claims.

DETAILED DESCRIPTION

Treating pain and other disorders via neurostimulation may depend on variables of a patient's environment, such as level of activity. For instance, patients may require a higher dose of stimulation while engaged in physical activity than when at rest. Other factors may affect the level of pain relief a patient experiences from a given stimulation setting. A subject may be at rest in the same posture, but the effects of therapy may vary depending on if the subject is sleeping or awake, or are distracted (e.g. watching TV) or not. Sensors internal and external to the neurostimulation device may be leveraged to inform the optimal level and modality of stimulation for the current patient environment.

The techniques of this disclosure use data collected from a patient and patient's environment as one of the factors to determine the therapy for current situation of the patient. This data may include physiological data (e.g., ECAPs, heart rate, body temperature, blood pressure, body position and activity) and data about the patient's environment (e.g. accelerometer, mobile phone data, acoustic sensor). Adjustments to the therapy may include adjustments to stimulation settings such as pulse width, frequency, electrode selection, combination of waveforms, cycling settings, and closed-loop algorithm parameters. Determination of optimal therapy based on data input can be made via simple classification or more complicated machine learning methods, which may be based on short timeframes as well as based on long-term historical data. In some examples, the machine learning algorithms may be based on the specific patient and may also include a broader population of patients, e.g., categorized by various factors such as age, fitness level, lifestyle, and similar factors.

Figure 1:
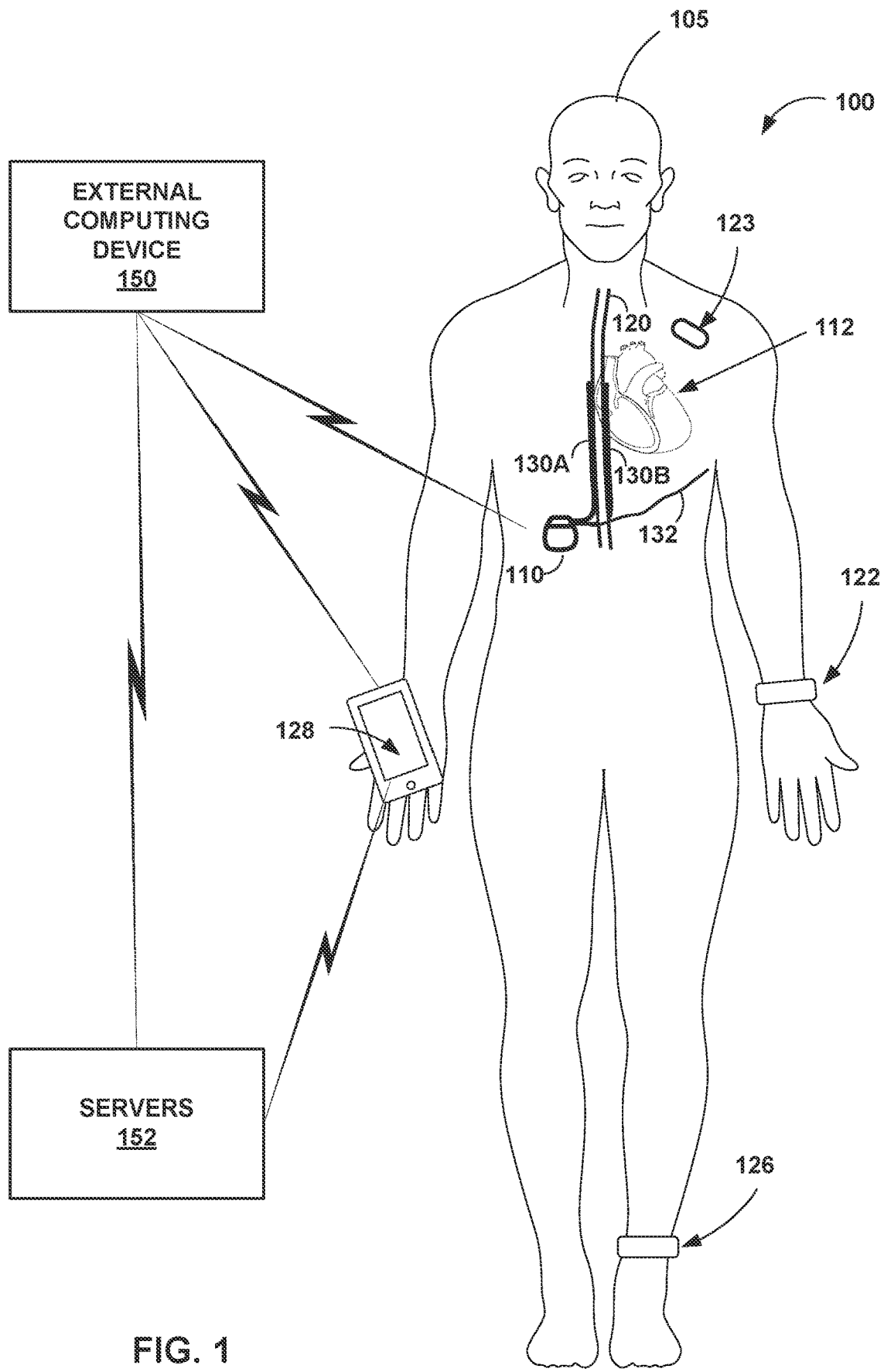
FIG. 1 is a conceptual diagram illustrating an example system that includes an external programmer and an implantable medical device (IMD) configured to sense bioelectrical signals and deliver spinal cord stimulation (SCS) therapy, in accordance with one or more techniques of this disclosure.

FIG. 1 is a conceptual diagram illustrating an example system 100 that includes an implantable medical device (IMD) 110 configured to deliver spinal cord stimulation (SCS) therapy and an external programmer 150, in accordance with one or more techniques of this disclosure. Although the techniques described in this disclosure are generally applicable to a variety of medical devices including external devices and IMDs, this disclosure will describe application of such techniques to IMDs and, more particularly, implantable electrical stimulators (e.g., neurostimulators) for purposes of illustration. More particularly, the disclosure will refer to an implantable SCS system for purposes of illustration, but without limitation as to other types of medical devices or other therapeutic applications of medical devices.

As shown in FIG. 1, system 100 includes an IMD 110, leads 130A and 130B, and external programmer 150 shown in conjunction with a patient 105, who is a human patient in the example of FIG. 1. In the example of FIG. 1, IMD 110 is an implantable electrical stimulator that is configured to generate and deliver electrical stimulation therapy to patient 105 via one or more electrodes (not shown in FIG. 1) of leads 130A and/or 130B (collectively, "leads 130"), e.g., for relief of chronic pain or other symptoms. In the example of FIG. 1, leads 130 are located proximal to spinal cord 120 of patient 105. In other examples, IMD 110 may be coupled to a single lead carrying multiple electrodes or more than two leads each carrying multiple electrodes, e.g., including lead 132.

In other examples, IMD 110 may be a leadless device that includes one or more electrodes attached to or integral to the housing of IMD 110. A leadless implementation of IMD 110 (not shown in FIG. 1) may also sense bioelectrical signals and deliver electrical stimulation through electrodes located proximal to target tissue of patient 105. In some examples such a leadless IMD may be located near one or more internal organs, along spinal cord 120, as shown in FIG. 1 or, for example, near tissue exposed by a laminectomy. With a laminectomy, a surgeon may remove part the vertebral bone of patient 105, which may help ease pressure on the spinal cord or the nerve roots. In other examples, IMD 110 may include a combination of electrodes on the housing as well as electrodes on leads 130.

Electrical stimulation may be delivered in the form of stimulation pulses. In some examples, IMD 110 may be configured to generate and deliver stimulation pulses to include control pulses configured to elicit evoked compound action potential (ECAP) signals and/or cause IMD 110 to sense stimulation signals. The control pulses may or may not contribute to therapy in some examples. In some examples, IMD 110 may, in addition to control pulses, deliver informed pulses that contribute to the therapy for the patient, but which do not elicit detectable ECAPs or cause IMD 110 to detect every phase of responsive stimulation signals. It may be possible for the informed pulses to elicit ECAPs and/or detectable ECAPs.

System 100 may be configured to use data collected from patient 105, and the environment of patient 105, to determine the situation of patient 105 and to adjust the therapy for current situation of patient 105. This can include physiological data (e.g., ECAPs described above, body temperature, blood pressure, cardiac activity such as heart rate, electrocardiogram (ECG), and heart rhythm) and data about the patient's environment (e.g., based on accelerometer information, mobile phone data, acoustic sensor). The patient situation may include the patient state, such as standing, sitting, relaxed, under stress, active, at rest, and similar states, as well as the environment for patient 105. The environment may include quiet, noisy, light, dark, moving in a vehicle, warm, cold, in a room with a television, and similar environmental factors. Processing circuitry of system 100 may adjust one or more therapy parameters based on the patient situation including stimulation settings such as pulse width, frequency, electrode selection, electrode firing probability or average firing rate, combination of waveforms, cycling settings, and closed-loop algorithm parameters. Determination of the therapy parameters based on data input can be made via simple classification or more complicated machine learning methods.

In some examples, sensing of the current situation of patient 105 may be based on bioelectrical signals collected by electrodes of leads 130 and received by sensing circuitry and processing circuitry of IMD 110. Processing circuitry of IMD 110 may interleave data collection between delivery and sensing for feedback of neurological stimulation therapy. Processing circuitry of system 100, e.g., any of the processing circuitry of IMD 110, portable computing device 128, external computing device 150, or servers 152, may store the received bioelectrical signals at a memory location and may analyze and evaluate the received signals to determine the current situation of patient 105. Some examples of determined information from the sensed bioelectrical signals from the patient may include a respiration rate, cardiac rhythm, and biological impedance.

System 100 may include one or more sensors configured to determine posture and activity information of patient 105, which may also be stored at a memory location as part of the sensed signals. The sensors may include accelerometers, gyroscopes, global positioning sensors, magnetometers, or other position and movement sensors. An advantage of system 100 is that IMD 110 may include the one or more accelerometers as well as other sensors along with the sensing circuitry to detect the bioelectrical signals. In this manner, IMD 110 alone may determine the current situation of patient 105, in some examples. Processing circuitry of system 100 may characterize pain, heart health, mobility (including gait, body orientation, etc.), activity, e.g., sleep, sleep stage, exercise, and other patient states using sensing capabilities of IMD 110, rather than requiring additional devices with sensors to perform the characterization. In other words, processing circuitry of system 100 may correlate inputs to provide an overall picture of patient health personalized for an individual patient and may take some action based on the provided overall picture, e.g., upload information to servers 152, output an alert, change therapy, and other similar actions. In this disclosure, various position and movement sensors may be referred to as "accelerometers" to simplify the description and to distinguish from sensing circuitry configured to measure bioelectrical signals, e.g., any biopotential, but "accelerometer" should be interpreted to mean any type of movement or position sensor, unless otherwise noted.

In some examples, system 100 may be configured to sense environmental and patient information from sensors external to IMD 110. For example, a second medical device 123, which may be implantable or wearable, may also include one or more sensors configured to detect blood chemistry, temperature, movement, and other similar measurements. In some examples IMD 110, or external computing device 150, may communicate with device 123. In some examples, device 123 may be some other medical device configured to monitor and or provide therapy to patient 105, such as pacemaker, defibrillator, blood pressure monitor, glucose monitor, EEG monitoring device or other similar medical device. In the example of a drug pump, device 123 may sense bioelectrical signals and accelerometer signals to monitor response to drug delivery. Patient 105 may also have one or more wearable devices 122 and 126, such as a smart watch, fitness tracker, or similar device that may provide GPS location, temperature, cardiac rhythm of heart 112, blood oxygen level estimate, posture and movement, audio sensors, visual sensors which may detect light level and color, and other measurements. Patient 105 may also use portable computing device 128, which may be a tablet computer, mobile phone, or similar computing device with a user interface configured to display information and warnings, ask questions, and receive input from patient 105. Portable computing device 128 may also include cameras, microphones, temperature sensors, accelerometers, communication circuitry and other components that may provide measurements to system 100 to determine the current situation of patient 105.

Some examples of current patient situation may include exercise, sleep, seated, riding in a vehicle, and numerous other situations for patient 105. For example, a quiet, dark environment with the patient in a supine, prone or fetal position may indicate sleep for some patients. In other examples, a seated position, with ambient noise, light of a specific color, such as output by a television, may indicate for some patients that the patient is distracted watching television. In other examples, the same noise level, posture, activity, and lighting, indicating TV watching, along with data measuring cardiac rhythm, respiration, and other factors, may indicate a sleep state for the patient.

Sleep and activity may be linked to the chronic pain journey, or other symptoms that patients navigate. System with an implanted accelerometer, e.g., in IMD 110, and sensing amplifiers to record ECAPS may also detect heart rate, breathing patterns and other factors of the current situation of patient 105. System 100 may use the combination of these signals and correlating the received signals to determine sleep, sleep stage, and activity level, and other patient states, and use these signals to predict patient's pain status and recommend therapy and behavioral changes by tailoring therapy to a physiologic state and environment for each individual patient.

In some examples, system 100 may also include the time of day when evaluating patient situation. Patient 105 may establish a daily and weekly routine. System 100 may determine an expected time for patient activity, or other aspects of patient situation. Patient 105 may have a range of time for going to sleep, for waking up, for outdoor activity or any other aspect of patient situation described herein. The processing circuitry may also use the time of day to help determine the patient state and degree of distraction. In some examples, processing circuitry of system 100 may correlate the time of day, along with indications from other sensors to determine, based on executing programming instructions, what action to take.

Other examples of patient situation may include the current weather near patient 105. In some examples, the weather, e.g., outside temperature, humidity, sunny, cloudy, rain, snow and so on, may correlate to patient symptoms, e.g., pain or mental state. In some examples, portable computing device 128 and wearable devices 122 and 126 may be configured to receive weather information, even if not directly measurable by the devices. Processing circuitry of system 100 may include weather information to adjust the treatment of patient 105.

As noted above, in some examples, processing circuitry of system 100 may determine patient state and current patient situation using predetermined classification, e.g., threshold for received information. In other examples, processing circuitry of system 100 may employ artificial intelligence techniques, such as machine learning to determine patent state as well as to tailor therapy to the patient state, as well as to progression of the condition or disease of patient 105 over time. For example, the processing circuitry may determine the degree of distraction for patient 105 and may reduce the stimulation intensity for pain therapy, in some examples, for more highly distracted patients because the processing circuitry may learn, or be programmed, such that the processing circuitry may determine that patient 105 needs less pain therapy when distracted. In this manner, the system of this disclosure may prolong battery life in some examples, by reducing power output as well as avoiding patient accommodation to the pain therapy.

In this disclosure, the degree of distraction may refer to the degree of which patient 105 is occupied with other activities and may not notice the symptoms for which IMD 110 was implanted to treat. For example, a patient subject to chronic pain may be less likely to notice the pain when focused on driving a car, or other activities where the patient may be distracted from their symptoms. Similarly, a sensitive patient, that may be able to feel the delivery of electrical stimulation, e.g., tingling and paresthesia, may be less likely to notice the electrical stimulation when distracted by other activities. In some examples, IMD 110 may deliver one or more control pulses to elicit an ECAP when IMD 110 detects a higher degree of distraction for patient 105 because a control pulse may have a higher intensity than an informed pulse, which is used to treat the symptoms. The control pulse may be above the perception threshold of patient 105 and therefore be more comfortable for patient 105 if delivered when patient 105 is distracted.

In other examples, processing circuitry of system 100 may determine a degree of distress for patient 105 and may adjust the output electrical stimulation therapy accordingly. For example, the processing circuitry may learn that certain postures and movements may be a presentation of increased pain or other distress for a particular patient. In some examples, the processing circuitry may determine the degree of distress of patient 105 based respiration activity, e.g., a change in breathing pattern, deeper or shallower breathing, hyperventilation, and other measured respiration activity. For some patients, spastic or dystonic increases may help identify respiration changes and distress. In some examples, responsive to determining the degree of distress, the processing circuitry may output a command signal, e.g., to provide an alert to the patient or a caregiver, or control another device such as signal a drug pump to output increased or more frequent pain relief dose.

In some examples, processing circuitry of system 100 may offload more computationally intensive analysis to more powerful computing devices. For example, external computing device 150, or servers 152, may perform some computationally intense analysis and provide results to IMD 110.

IMD 110 may be a chronic electrical stimulator that remains implanted within patient 105 for weeks, months, or even years. In other examples, IMD 110 may be a temporary, or trial, stimulator used to screen or evaluate the efficacy of electrical stimulation for chronic therapy. In one example, IMD 110 is implanted within patient 105, while in another example, IMD 110 is an external device coupled to percutaneously implanted leads. In some examples, IMD 110 uses one or more leads, while in other examples, IMD 110 is leadless. In other examples, IMD 110 may also be include an implantable component and an external component that provides power or commands to the implantable component.

IMD 110 may be constructed of any polymer, metal, or composite material sufficient to house the components of IMD 110 (e.g., components illustrated in FIG. 2) within patient 105. In this example, IMD 110 may be constructed with a biocompatible housing, such as titanium or stainless steel, or a polymeric material such as silicone, polyurethane, or a liquid crystal polymer, and surgically implanted at a site in patient 105 near the pelvis, abdomen, or buttocks. In other examples, IMD 110 may be implanted within other suitable sites within patient 105, which may depend, for example, on the target site within patient 105 for the delivery of electrical stimulation therapy. The outer housing of IMD 110 may be configured to provide a hermetic seal for components, such as a rechargeable or non-rechargeable power source. In addition, in some examples, the outer housing of IMD 110 is selected from a material that facilitates receiving energy to charge the rechargeable power source.

IMD 110 may deliver electrical stimulation energy, which may be constant current or constant voltage-based pulses, for example, to one or more target tissue sites of patient 105 via one or more electrodes (not shown) of implantable leads 130. In the example of FIG. 1, leads 130 carry electrodes that are placed adjacent to the target tissue of spinal cord 120. One or more of the electrodes may be disposed at a distal tip of a leads 130 and/or at other positions at intermediate points along the lead. Leads 130 may be implanted and coupled to IMD 110. The electrodes may transfer electrical stimulation generated by an electrical stimulation generator in IMD 110 to tissue of patient 105. Although leads 130 may each be a single lead, leads 130 may include a lead extension, e.g., lead 132 or other segments that may aid in implantation or positioning of leads 130.

The electrodes of leads 130 may be electrode pads on a paddle lead, circular (e.g., ring) electrodes surrounding the body of the lead, conformable electrodes, cuff electrodes, segmented electrodes (e.g., electrodes disposed at different circumferential positions around the lead instead of a continuous ring electrode), any combination thereof (e.g., ring electrodes and segmented electrodes) or any other type of electrodes capable of forming unipolar, bipolar or multipolar electrode combinations for therapy. Ring electrodes arranged at different axial positions at the distal ends of lead 130 will be described for purposes of illustration.

The deployment of electrodes via leads 130 is described for purposes of illustration, but arrays of electrodes may be deployed in different ways. For example, a housing associated with a leadless stimulator may carry arrays of electrodes, e.g., rows and/or columns (or other patterns), to which shifting operations may be applied. Such electrodes may be arranged as surface electrodes, ring electrodes, or protrusions. As a further alternative, electrode arrays may be formed by rows and/or columns of electrodes on one or more paddle leads. In some examples, electrode arrays include electrode segments, which are arranged at respective positions around a periphery of a lead, e.g., arranged in the form of one or more segmented rings around a circumference of a cylindrical lead. In other examples, one or more of leads 130 are linear leads having 8 ring electrodes along the axial length of the lead. In another example, the electrodes are segmented rings arranged in a linear fashion along the axial length of the lead and at the periphery of the lead. In some examples, processing circuitry of system 100 may determine lead position relative anatomy, such as changes in position relative to spinal cord 120, or other target tissue.

The stimulation parameter of a therapy stimulation program that defines the stimulation pulses of electrical stimulation therapy by IMD 110 through the electrodes of leads 130 may include information identifying which electrodes have been selected for delivery of stimulation according to a stimulation program, the polarities of the selected electrodes, i.e., the electrode combination for the program, and voltage or current amplitude, pulse frequency, pulse width, pulse shape of stimulation delivered by the electrodes. These stimulation parameters of stimulation pulses (e.g., control pulses and/or informed pulses) are typically predetermined parameter values determined prior to delivery of the stimulation pulses (e.g., set according to a stimulation program). However, in some examples, system 100 changes one or more parameter values automatically based on one or more factors or based on user input.

Although FIG. 1 is directed to SCS therapy, e.g., used to treat pain, in other examples system 100 may be configured to treat any other condition that may benefit from electrical stimulation therapy. For example, system 100 may be used to treat tremor, Parkinson's disease, epilepsy, a pelvic floor disorder (e.g., urinary incontinence or other bladder dysfunction, fecal incontinence, pelvic pain, bowel dysfunction, or sexual dysfunction), obesity, gastroparesis, or psychiatric disorders (e.g., depression, mania, obsessive compulsive disorder, anxiety disorders, and the like). In this manner, system 100 may be configured to provide therapy taking the form of deep brain stimulation (DBS), peripheral nerve stimulation (PNS), peripheral nerve field stimulation (PNFS), cortical stimulation (CS), and other neuronal, or non-neuronal tissue stimulation including glial cells, pelvic floor stimulation, gastrointestinal stimulation, or any other stimulation therapy capable of treating a condition of patient 105. In some examples, system 100 may include an implantable medical device located to measure and stimulate intercostal nerves such as for post-thoracotomy or post-mastectomy pain, and located in the chest wall of patient and/or PNS for post-herniorrhaphy pain. The electrodes for such a device may also interleave sensing cardiac signals, thoracic impedance or other biopotentials to perform the functions described in this disclosure.

IMD 110 is configured to deliver electrical stimulation therapy to patient 105 via selected combinations of electrodes carried by one or both of leads 130, alone or in combination with an electrode carried by or defined by an outer housing of IMD 110. The target tissue for the electrical stimulation therapy may be any tissue affected by electrical stimulation, which may be in the form of electrical stimulation pulses or continuous waveforms. In some examples, the target tissue includes nerves, smooth muscle, or skeletal muscle. In the example illustrated by FIG. 1, the target tissue is tissue proximate spinal cord 120, such as within an intrathecal space or epidural space of spinal cord 120, or, in some examples, adjacent nerves that branch off spinal cord 120. Leads 130 may be introduced into spinal cord 120 in via any suitable region, such as the thoracic, cervical, or lumbar regions. Stimulation of spinal cord 120 may, for example, prevent pain signals from traveling through spinal cord 120 and to the brain of patient 105. Patient 105 may perceive the interruption of pain signals as a reduction in pain and, therefore, efficacious therapy results. In other examples, stimulation of spinal cord 120 may produce paresthesia which may be reduce the perception of pain by patient 105, and thus, provide efficacious therapy results.

IMD 110 generates and delivers electrical stimulation therapy to a target stimulation site within patient 105 via the electrodes of leads 130 to patient 105 according to one or more therapy stimulation programs. A therapy stimulation program defines values for one or more parameters that define an aspect of the therapy delivered by IMD 110 according to that program. For example, a therapy stimulation program that controls delivery of stimulation by IMD 110 in the form of pulses may define values for voltage or current pulse amplitude, pulse width, and pulse rate (e.g., pulse frequency) for stimulation pulses delivered by IMD 110 according to that program.

In some examples where relevant phases of stimulation signals cannot be detected from the types of pulses intended to be delivered to provide therapy to the patient, control pulses and informed pulses may be delivered. For example, IMD 110 is configured to deliver control stimulation to patient 105 via a combination of electrodes of leads 130, alone or in combination with an electrode carried by or defined by an outer housing of IMD 110. The tissue targeted by the control stimulation may be the same tissue targeted by the electrical stimulation therapy, but IMD 110 may deliver control stimulation pulses via the same, at least some of the same, or different electrodes. Since control stimulation pulses are delivered in an interleaved manner with informed pulses, a clinician and/or user may select any desired electrode combination for informed pulses. Like the electrical stimulation therapy, the control stimulation may be in the form of electrical stimulation pulses or continuous waveforms.

In one example, each control stimulation pulse may include a balanced, bi-phasic square pulse that employs an active recharge phase. However, in other examples, the control stimulation pulses may include a monophasic pulse followed by a passive recharge phase. In other examples, a control pulse may include an imbalanced bi-phasic portion and a passive recharge portion. In some examples, the passive recharge may be interrupted or delayed to the end of the control pulse. In other examples, a control stimulation pulse may include a tri-phasic pulse or pulse having more than three phases. Although not necessary, a bi-phasic control pulse may include an interphase interval between the positive and negative phase to promote propagation of the nerve impulse in response to the first phase of the bi-phasic pulse. The control stimulation may be delivered without interrupting the delivery of the electrical stimulation informed pulses, such as during the window between consecutive informed pulses. In some cases, the control pulses may elicit an ECAP signal from the tissue, and IMD 110 may sense the ECAP signal via two or more electrodes on leads 130. In some examples, control pulses might not elicit ECAPs that are detectible by IMD 110, however IMD 110 may detect stimulation signals responsive to the control pulses. The control pulses may include information that is useful for determining parameters of one or more stimulation delivered to patient 105. In cases where the control stimulation pulses are applied to spinal cord 120, the signal may be sensed by IMD 110 from spinal cord 120.

IMD 110 may deliver control stimulation to a target stimulation site within patient 105 via the electrodes of leads 130 according to one or more test stimulation programs. The one or more test stimulation programs may be stored in a storage device of IMD 110. Each test program of the one or more test stimulation programs includes values for one or more parameters that define an aspect of the control stimulation delivered by IMD 110 according to that program, such as current or voltage amplitude, pulse width, pulse frequency, electrode combination, and, in some examples, timing based on informed pulses to be delivered to patient 105. In some examples, IMD 110 delivers control stimulation to patient 105 according to multiple test stimulation programs.

A user, such as a caregiver, clinician, or patient 105, may interact with a user interface of an external programmer 150 to program IMD 110. Programming of IMD 110 may refer generally to the generation and transfer of commands, programs, or other information to control the operation of IMD 110. In this manner, IMD 110 may receive the transferred commands and programs from external programmer 150 to control electrical stimulation therapy (e.g., informed pulses) and control stimulation (e.g., control pulses). For example, external programmer 150 may transmit therapy stimulation programs, test stimulation programs, stimulation parameter adjustments, therapy stimulation program selections, test program selections, user input, or other information to control the operation of IMD 110, e.g., by wireless telemetry or wired connection. As described herein, stimulation delivered to the patient may include control pulses, and, in some examples, stimulation may include control pulses and informed pulses.

In some cases, external computing device 150 may be characterized as a physician or clinician programmer if it is primarily intended for use by a physician or clinician. In other cases, external computing device 150 may be characterized as a patient programmer if it is primarily intended for use by a patient. A patient programmer may be generally accessible to patient 105 and, in many cases, may be a portable device that may accompany patient 105 throughout the patient's daily routine. For example, a patient programmer may receive input from patient 105 when the patient wishes to terminate or change electrical stimulation therapy. In general, a physician or clinician programmer may support selection and generation of programs by a clinician for use by IMD 110, whereas a patient programmer may support adjustment and selection of such programs by a patient during ordinary use. In other examples, external programmer 150 may include, or be part of, an external charging device that recharges a power source of IMD 110. In this manner, a user may program and charge IMD 110 using one device, or multiple devices. In some examples, patient 105 may control some activity of IMD 110 using portable computing device 128.

As described herein, information may be transmitted between external computing device 150 and IMD 110. External programmer 150, IMD 110, servers 152, portable computing device 128, medical device 123 and wearable devices 122 and 126 may communicate via wireless communication using any techniques known in the art. Examples of communication techniques may include, for example, radiofrequency (RF) telemetry and inductive coupling, but other techniques are also contemplated. In some examples, external programmer 150 includes a communication head that may be placed proximate to the patient's body near the IMD 110 implant site to improve the quality or security of communication between IMD 110 and external programmer 150. Communication between external programmer 150 and IMD 110 may occur during power transmission or separate from power transmission.

In some examples, IMD 110, in response to commands from external computing device 150, delivers electrical stimulation therapy according to a plurality of therapy stimulation programs to a target tissue site of the spinal cord 120 of patient 105 via electrodes (not depicted) on leads 130. In some examples, IMD 110 modifies therapy stimulation programs as therapy needs of patient 105 evolve over time. For example, the modification of the therapy stimulation programs may cause the adjustment of at least one parameter of the plurality of informed pulses. When patient 105 receives the same therapy for an extended period, the efficacy of the therapy may be reduced. In some cases, parameters of the plurality of informed pulses may be automatically updated.

In one or more cases where stimulation pulses elicit ECAPs, electrical stimulation therapy delivery by leads 130 of IMD 110 may cause neurons within the target tissue to evoke a compound action potential that travels up and down the target tissue (e.g., nerve fibers), eventually detected by sensing electrodes of IMD 110. Furthermore, control stimulation may also elicit at least one ECAP, and ECAPs responsive to control stimulation may also be a surrogate for the effectiveness of the therapy. The amount of action potentials (e.g., number of neurons propagating action potential signals) that are evoked may be based on the various parameters of electrical stimulation pulses such as amplitude, pulse width, frequency, pulse shape (e.g., slew rate at the beginning and/or end of the pulse), etc. The slew rate may define the rate of change of the voltage and/or current amplitude of the pulse at the beginning and/or end of each pulse or each phase within the pulse. For example, a very high slew rate indicates a steep or even near vertical edge of the pulse, and a low slew rate indicates a longer ramp up (or ramp down) in the amplitude of the pulse. In some examples, these parameters contribute to an intensity of the electrical stimulation. In addition, a characteristic of the ECAP signal (e.g., an amplitude) may change based on the distance between the stimulation electrodes and the nerves subject to the electrical field produced by the delivered control stimulation pulses.

In some examples, in response to the patient state, processing circuitry, e.g., of IMD 110 may output the electronic signal to control the stimulation generation circuitry of IMD 110 to deliver a control pulse configured to elicit an ECAP perceptible to the patient as an alert. For example, IMD 110 may detect a sleep apnea state for patient 105 and elicit an ECAP, or series of ECAPs interleaved with the other stimulation therapy for patient 105, to wake patient 105, or cause a similar response to interrupt the sleep apnea. In this example, presence of an ECAP of a desired amplitude may indicate relatively strong perception by the patient.

In one or more cases where a stimulation pulse causes IMD 110 to sense one or more respective stimulation signals, one or more characteristics of the respective stimulation signal may indicate an efficacy of the electrical stimulation delivered to patient 105 by IMD 110. For example, it may be beneficial for a voltage or electrical current magnitude of the stimulation signal to be at a target stimulation signal value. In one example, the target stimulation signal value may be a target range from a first threshold magnitude value to a second threshold magnitude value. If the voltage magnitude of the stimulation signal is less than the first threshold magnitude value, the electrical stimulation might not be as effective at treating pain perceived by patient 105 as compared with scenarios in which the voltage magnitude of the stimulation signal is within the target range. On the other hand, if the voltage magnitude of the stimulation signal is greater than the second threshold magnitude value, the electrical stimulation might be inducing an uncomfortable (e.g., unwanted, or painful) sensation perceived by patient 105 as compared with examples in which the voltage magnitude of the stimulation signal is within the target range. In some examples, IMD 110 may control the voltage magnitude of the stimulation signal to be within a target range by changing and/or setting one or more parameters of subsequent stimulation pulses (e.g., control pulses and/or informed pulses) delivered to patient 105 in response to measuring the voltage magnitude of one or more detected stimulation signals.

Additionally, or alternatively, the target stimulation signal value (e.g., the target range) of characteristic values of the stimulation signals may depend on a posture of patient 105. For example, IMD 110 may include a sensor, such as an accelerometer as described above (not illustrated in FIG. 1) which is configured to generate an accelerometer signal to indicate changes in position, velocity, acceleration, or orientation of IMD 110. IMD 110 may be configured to determine, based on the accelerometer signal, a posture of patient 105. The determined posture may be a posture of a set of postures including a standing posture, a seated posture, a supine posture, a prone posture, and a side-lying posture, as examples. IMD 110 may be configured to select the target range of characteristic values of a stimulation signal based on the determined posture of patient 105. As discussed above, processing circuitry of system 100 may include information regarding the posture of patient 105, along with other sensed signals, to determine the current situation of patient 105 and, in response, may output a command signal to adjust stimulation therapy, cause an alert via servers 152 or portable computing device 128, control medical device 123 or perform other actions.

As noted above, the description of FIG. 1 may describe IMD 110 as performing a variety of processing and computing functions. However, external programmer 150, servers 152, portable computing device 128 or any combination of the above may instead perform one, several, or all of these functions. In some alternative examples, IMD 110 may relay sensed signals to external programmer 150 for analysis, and external programmer 150 transmits instructions to IMD 110 to adjust the one or more parameters defining the electrical stimulation therapy based on analysis of the sensed signals. For example, IMD 110 may relay the sensed signal indicative of a stimulation signal to external programmer 150. External programmer 150, or other processing circuitry of FIG. 1, may compare a characteristic value of the stimulation signal to the respective target range of characteristic values, and in response to the comparison, external programmer 150 may instruct IMD 110 to adjust one or more parameters that define the electrical stimulation pulses delivered to patient 105.

Figure 2:
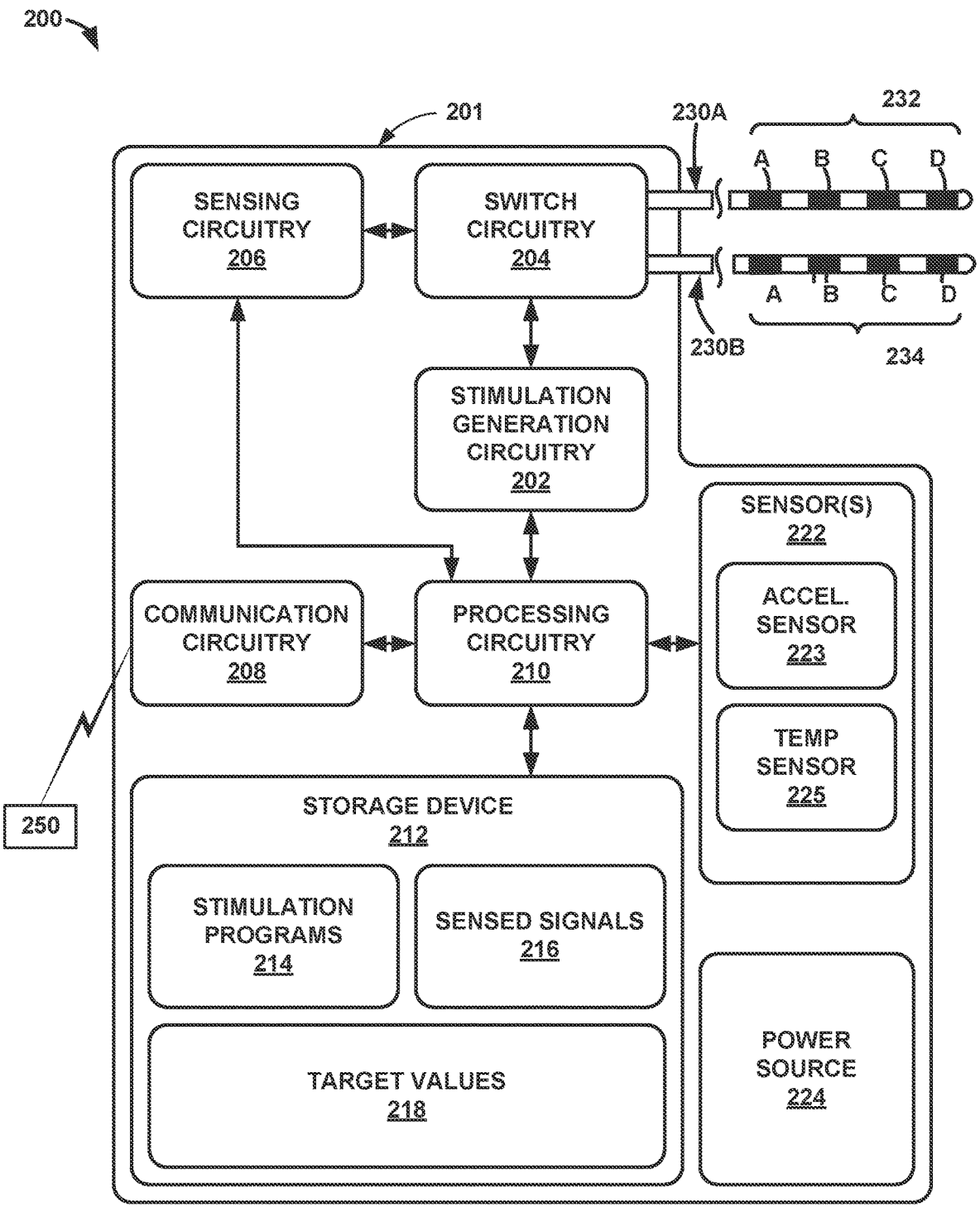
FIG. 2 is a block diagram illustrating an example configuration of components of the IMD of FIG. 1, in accordance with one or more techniques of this disclosure.

FIG. 2 is a block diagram illustrating an example configuration of components of IMD 201, in accordance with one or more techniques of this disclosure. IMD 201 is example of IMD 110 of FIG. 1 and may have the same or similar functions and characteristics. In the example shown in FIG. 2, IMD 201, along with external computing device 250 is part of system 200, which is an example of system 100 depicted in FIG. 1. IMD 201 includes stimulation generation circuitry 202, switch circuitry 204, sensing circuitry 206, communication circuitry 208, processing circuitry 210, storage device 212, sensor(s) 222, and power source 224. As seen in FIG. 2, sensor(s) 222 include acceleration sensor 223 and temperature sensor 225.

In the example shown in FIG. 2, storage device 212 stores stimulation programs 214 and sensed signals 216 in separate memories within storage device 212 or separate areas within storage device 212. Each stored stimulation program of stimulation programs 214 may include therapy and test stimulation programs that define values for a set of electrical stimulation parameters (e.g., a stimulation parameter set), such as a stimulation electrode combination, electrode polarity, current or voltage amplitude, pulse width, pulse rate, and pulse shape. Stimulation programs 214 may also have additional information such as instructions regarding when to deliver control pulses based on the pulse width and/or frequency of the informed pulses defined in stimulation programs 214. In examples in which control pulses are provided to the patient without the need for informed pulses, a separate test stimulation program may not be needed. Instead, the test stimulation program for therapy that only includes control pulses may define the same control pulses as the corresponding therapy stimulation program for those control pulses.

Accordingly, in some examples, stimulation generation circuitry 202 generates electrical stimulation signals in accordance with the electrical stimulation parameters noted above. Other ranges of stimulation parameter values may also be useful and may depend on the target stimulation site within patient 105. To simplify the description, this disclosure may focus on stimulation "pulses," however, stimulation signals may be of any form, such as continuous-time signals (e.g., sine waves), bursts or sequences of stimulation as well as other forms of electrical stimulation and may be voltage driven or current driven.

Switch circuitry 204 may include one or more switch arrays, one or more multiplexers, one or more switches (e.g., a switch matrix or other collection of switches), or other electrical circuitry configured to direct stimulation signals from stimulation generation circuitry 202 to one or more of electrodes 232, 234, or directed sensed signals from one or more of electrodes 232, 234 to sensing circuitry 206. In other examples, stimulation generation circuitry 202 and/or sensing circuitry 206 may include sensing circuitry to direct signals to and/or from one or more of electrodes 232, 234, which may or may not also include switch circuitry 204.

Sensing circuitry 206 monitors signals from any combination of electrodes 232, 234. In some examples, sensing circuitry 206 includes one or more amplifiers, filters, and analog-to-digital converters. Sensing circuitry 206 may be used to sense physiological signals, such as ECAPs, biological impedance, electrical field imaging and so on. Additionally, or alternatively, sensing circuitry 206 may sense one or more stimulation pulses delivered to patient 105 via electrodes 232, 234. In some examples, sensing circuitry 206 detects electrical signals, such as stimulation signals and/or ECAPs from a particular combination of electrodes 232, 234. In some cases, the particular combination of electrodes for sensing ECAPs includes different electrodes than a set of electrodes 232, 234 used to deliver stimulation pulses as described above in relation to FIG. 1. Alternatively, in other cases, the particular combination of electrodes used for sensing ECAPs includes at least one of the same electrodes as a set of electrodes used to deliver stimulation pulses to patient 105. Sensing circuitry 206 may provide signals to an analog-to-digital converter, for conversion into a digital signal for processing, analysis, storage, or output by processing circuitry 210. Processing circuitry 210 may store sensed signals at sensed signals 216 and/or output the sensed signals to external computing device 250, or other computing devices described above in relation to FIG. 1.

Communication circuitry 208 supports wireless communication between IMD 201 and an external programmer (not shown in FIG. 2) or another computing device under the control of processing circuitry 210. Processing circuitry 210 of IMD 201 may receive, as updates to programs, values for various stimulation parameters such as amplitude and electrode combination, from the external programmer via communication circuitry 208. Updates to the stimulation programs 214 may be stored within storage device 212. Communication circuitry 208 in IMD 201, as well as communication circuits in other devices and systems described herein, such as the external programmer, may accomplish communication by radiofrequency (RF) communication techniques. In addition, communication circuitry 208 may communicate with an external medical device programmer (not shown in FIG. 2) via proximal inductive interaction of IMD 201 with the external programmer. The external programmer may be one example of external programmer 150 of FIG. 1. Accordingly, communication circuitry 208 may send information to the external computing devices on a continuous basis, at periodic intervals, or upon request, e.g., from external computing device 250.

Processing circuitry 210 may include any one or more of a microprocessor, a controller, a digital signal processor (DSP), an application specific integrated circuit (ASIC), a field-programmable gate array (FPGA), discrete logic circuitry, or any other processing circuitry configured to provide the functions attributed to processing circuitry 210 herein may be embodied as firmware, hardware, software, or any combination thereof. Processing circuitry 210 controls stimulation generation circuitry 202 to generate stimulation signals according to stimulation programs 214 stored in storage device 212 to apply stimulation parameter values specified by one or more of programs, such as amplitude, pulse width, pulse rate, and pulse shape of each of the stimulation signals.

In the example shown in FIG. 2, the set of electrodes 232 includes electrodes 232A, 232B, 232C, and 232D, and the set of electrodes 234 includes electrodes 234A, 234B, 234C, and 234D. In other examples, a single lead may include all eight electrodes 232 and 234 along a single axial length of the lead, as depicted in FIG. 1. Processing circuitry 210 also controls stimulation generation circuitry 202 to generate and apply the stimulation signals to selected combinations of electrodes 232, 234. In some examples, stimulation generation circuitry 202 includes a switch circuit (instead of, or in addition to, switch circuitry 204) that may couple stimulation signals to selected conductors within leads 230, which, in turn, deliver the stimulation signals across selected electrodes 232, 234. Such a switch circuit may be a switch array, switch matrix, multiplexer, or any other type of switching circuit configured to selectively couple stimulation energy to selected electrodes 232, 234 and to selectively sense bioelectrical neural signals of a spinal cord of the patient (not shown in FIG. 2) with selected electrodes 232, 234.

In other examples, however, stimulation generation circuitry 202 does not include a switch circuit and switch circuitry 204 does not interface between stimulation generation circuitry 202 and electrodes 232, 234. In these examples, stimulation generation circuitry 202 includes a plurality of pairs of voltage sources, current sources, voltage sinks, or current sinks connected to each of electrodes 232, 234 such that each pair of electrodes has a unique signal circuit. In other words, in these examples, each of electrodes 232, 234 is independently controlled via its own signal circuit (e.g., via a combination of a regulated voltage source and sink or regulated current source and sink), as opposed to switching signals between electrodes 232, 234.

Electrodes 232, 234 on respective leads 230 may be constructed of a variety of different designs. For example, one or both of leads 230 may include one or more electrodes at each longitudinal location along the length of the lead, such as one electrode at different perimeter locations around the perimeter of the lead at each of the locations A, B, C, and D. In one example, the electrodes may be electrically coupled to stimulation generation circuitry 202, e.g., via switch circuitry 204 and/or switching circuitry of the stimulation generation circuitry 202, via respective wires that are straight or coiled within the housing of the lead and run to a connector at the proximal end of the lead. In another example, each of the electrodes of the lead may be electrodes deposited on a thin film. The thin film may include an electrically conductive trace for each electrode that runs the length of the thin film to a proximal end connector. The thin film may then be wrapped (e.g., a helical wrap) around an internal member to form the lead 230. These and other constructions may be used to create a lead with a complex electrode geometry.

Although sensing circuitry 206 is incorporated into a common housing with stimulation generation circuitry 202 and processing circuitry 210 in FIG. 2, in other examples, sensing circuitry 206 may be in a separate housing from IMD 201 and may communicate with processing circuitry 210 via wired or wireless communication techniques.

Storage device 212 may be configured to store information within EVID 201 during operation. Storage device 212 may include a computer-readable storage medium or computer-readable storage device. In some examples, storage device 212 includes one or more of a short-term memory or a long-term memory. Storage device 212 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, storage device 212 is used to store programming instructions for execution by processing circuitry 210. As discussed above, storage device 212 is configured to store stimulation programs 214, and target values 218. Storage device 212 may also store other data, such as calibration values, temporary values, intermediate calculations, In some examples, stimulation generation circuitry 202 may be configured to deliver electrical stimulation therapy to patient 105. In some examples, the electrical stimulation therapy may include a plurality of informed pulses. Additionally, stimulation generation circuitry 202 may be configured to deliver a plurality of control pulses, where the plurality of control pulses is interleaved with at least some informed pulses of the plurality of informed pulses. Stimulation generation circuitry may deliver the plurality of informed pulses and the plurality of control pulses to target tissue (e.g., spinal cord 120) of patient 105 via electrodes 232, 234 of leads 230. By delivering such informed pulses and control pulses, stimulation generation circuitry 202 may cause IMD 201 to sense stimulation signals that are indicative of the delivered pulses.

Additionally, or alternatively, stimulation generation circuitry 202 may deliver control pulses that evoke detectable responsive ECAPs in the target tissue, the responsive ECAPs propagating through the target tissue before arriving back at electrodes 232, 234. Stimulation signals or ECAPs caused by or elicited by informed pulses may not be detectable by IMD 201. In some examples, a different combination of electrodes 232, 234 may sense responsive ECAPs and/or responsive stimulation signals than a combination of electrodes 232, 234 that delivers informed pulses and a combination of electrodes 232, 234 that delivers control pulses.

Sensing circuitry 206 may be configured to detect the responsive ECAPs and/or the responsive stimulation signals via electrodes 232, 234 and leads 230. In other examples, stimulation generation circuitry 202 may be configured to deliver a plurality of control pulses, without any informed pulses, when control pulses also provide or contribute to a therapeutic effect for the patient.

Processing circuitry 210 may, in some cases, direct sensing circuitry 206 to continuously monitor for ECAPs and stimulation signals. In other cases, processing circuitry 210 may direct sensing circuitry 206 to monitor for ECAPs and stimulation signals based on signals from sensor(s) 222. For example, processing circuitry 210 may activate sensing circuitry 206 based on an activity level of patient 105 exceeding an activity level threshold (e.g., acceleration sensor 223 rises above a threshold). Activating and deactivating sensing circuitry 206 may, in some examples, extend a battery life of power source 224.

As described above in relation to FIG. 1, sensing circuitry 206 may be configured to detect electrical signals, e.g., bioelectrical signals, via one or more electrodes. In some examples, electrodes used for sensing may be on leads 230 and configured to be implanted such that the electrodes are proximal to the spinal cord of the patient. In other examples, the electrodes may be located in different areas of the patient, e.g., lead 132 shown in FIG. 1, or on the housing of IMD 201. Processing circuitry 210 may store the electrical signals received from sensing circuitry 206 as sensed signals 216 in storage device 212. Processing circuitry 210 may also store posture and activity information of the patient as part of sensed signals 216. Based on the sensed signals 216, processing circuitry 210 may determine the current situation for the patient. As described above in relation to FIG. 1, processing circuitry 210, or other processing circuitry of system 200, may determine the degree of distraction, the degree of distress or other patient state of the patient based on the sensed signals. In some examples, responsive to determining the patient state, processing circuitry 210 may execute programming instructions to select an action and perform the selected action. The selected action may include to store collected information, upload the collected information to an external computing device, and output an electronic signal such as an alert or a command signal. In some examples, the command signal may control the stimulation circuitry to adjust the electrical stimulation to the patient.

IMD 201 may have advantages over other medical devices because IMD 201 includes one or more sensors 222 configured to determine posture and activity information of the patient as well as electrodes configured to sense nerve activity as well as other bioelectrical signals, as described above in relation to FIG. 1. In some examples, processing circuitry 210 is configured to analyze the electrical signals, such as bioelectrical signals received via electrodes 232 and 234, as well as other electrodes described above. Based on the analyzed signals, processing circuitry 210 may determine a respiration rate, cardiac rhythm, depth of respiration cycles, relative lead positioning between leads, muscle contraction state, biological impedance, and other measurements of patient state, as described above in relation to FIG. 1. In some examples, an external computing device, e.g., wearable device 122 of FIG. 1, may also determine skin impedance, or oximetry, which may indicate degree of distress or other symptoms and be correlated by processing circuitry of system 200 to determine an overall patient situation.

Processing circuitry 210 may also determine whether the degree of distraction satisfies a distraction threshold. Processing circuitry may determine a type of distraction, e.g., the patient is exercising, sleeping, watching television, streaming video, or audio, e.g., on device 128 of FIG. 1, and other activities, based on the received sensed signals. For some patients, outputting a control pulse to elicit an ECAP may be detectable and may be uncomfortable for the patient. Therefore, in response to determining that the degree of distraction satisfies the distraction threshold, processing circuitry 210 may control stimulation circuitry 202 and switch circuitry 204 to output a control pulse that elicits an ECAP response. In this manner, eliciting an ECAP response, which may help IMD 201 determine parameter settings for subsequent therapy stimulation, may be less noticeable for the patient and less uncomfortable. In other examples, responsive to determining that the degree of distraction satisfies the distraction threshold, processing circuitry 210 may control stimulation circuitry 202 to adjust, e.g., reduce or increase the output power, or some other parameter such as burst length, of the electrical stimulation therapy.

Similarly, processing circuitry 210, along with other processing circuitry or system 200, may determine a degree of distress of the patient based on the sensed signals. In some examples, particular posture, activity, respiration, cardiac activity, or other sensed signals may be different from patient to patient. In other examples, particular sensed signals may indicate distress, distraction, and other patient states across one or more groups of patients. For example, a heart rate above a heart rate threshold, respiration activity such as shallow breathing and one or more postures may indicate distress in the group of active, older adults, while different measured sensed signals may indicate distress in the group of sedentary older adults. In some examples, processing circuitry of system 200 may be trained to determine degree of distress, distraction, sleep apnea, and other patient states based on machine learning or some other artificial intelligence techniques. In other examples, a memory location operatively coupled to the processing circuitry may include one or more thresholds or combinations of thresholds to which the processing circuitry may compare sensed signals to determine the patient state. In some examples, the degree of distraction, and other patient states may also be based on received the sensed signals from external sensors, such as cameras, thermometers, and accelerometers located on wearable devices 122 and 126, portable computing device 128, or some other external sensor as described above in relation to FIG. 1.

As described above in relation to FIG. 1, responsive to determining the degree of distress, processing circuitry 210 may output a command signal. In some examples, causes stimulation circuitry 202 to adjust the delivery of the electrical stimulation to the patient based on the degree of distress. In other examples, the command signal may cause communication circuitry 208 to send an electronic message comprising a notification of the degree of distress or other patient state of the patient. The electronic message may alert the patient or a caregiver, e.g., via a user interface on portable computing device 128 or remotely via servers 152, as described above in relation to FIG. 1. In other examples, the command signal may cause a second medical device separate from the device to change an operation based on the degree of distress. For example, an increased degree of distress may indicate an increase in sensed pain for the patient. The second medical device may include an implantable or wearable drug pump, and the change of operation may include a change in drug dosage to the patient.

In other examples, system 200 and IMD 201 may be configured to monitor the patient for particular data for a specified duration. For example, IMD 201 may be configured to upload collected information for a sleep study, a mobility study, or other types of data collection to external computing device 250, e.g., for further upload to a caregiver. In some examples, system 200 may use combinations of sensors to determine patient physiologic state: sleep/no-sleep, sleep stage: rem, non-rem, number of times waking-up, sleep quality, sleep disturbances, time going to bed, time waking up, sleep apnea occurrence, restless leg syndrome, active or sedentary behavior over time. System 200 may provide the patient and/or caregiver with relevant feedback information on their sleep quality, characteristics, and activity level. IMD 201 of this disclosure may provide advantages over other options because such data collection may use a device that is already implanted in the patient to treat one or more disorders. Thus, data collection may not require added sensors, wires, and setup and may be conducted in the patient's home, rather than a laboratory, with little impact on the patient. Such a capability may be valuable for patients in rural areas where trips to a laboratory may be difficult and intrusive.

In some examples, ECAPs may be detectable by the patient as alerts to the patient. To output the electronic signal, processing circuitry 210 may be configured to control stimulation generation 202 circuitry to deliver a control pulse configured to elicit an ECAP signal perceptible to the patient as the alert.

Stimulation generation circuitry 202 may be configured to deliver one or more stimulation pulses, at least one of which may cause sensing circuitry 206 to sense a stimulation signal in response to the delivery of the respective pulse. In some examples, to sense a stimulation signal, sensing circuitry 206 may detect, via any one or combination of electrodes 232, 234, one or more electrical signals which are generated by stimulation generation circuitry 202 and delivered to patient 105 via any one or combination of electrodes 232, 234. In some examples, stimulation signals may generate information which may be useful for determining one or more parameters of subsequent therapy pulses generated by stimulation generation circuitry 202. For example, information included by a stimulation signal may include one or more characteristics which indicate an efficacy of therapy delivered to patient 105, depicted in FIG. 1, via electrodes 232, 234. In some cases, the one or more characteristics may reflect a separation between one or more of electrodes 232, 234 and target tissue of patient 105 (e.g., spinal cord 120). Such a distance between electrodes 232, 234 and spinal cord 120 may be relevant to determining therapy since a smaller intensity (e.g., amplitude and/or pulse length) of therapy pulses is required to stimulate a nerve if electrodes 232, 234 move closer to spinal cord 120 and vice versa.

Processing circuitry 210 may be configured to compare a characteristic value of a stimulation signal to a target stimulation signal value and adjust a stimulation parameter value based on the comparison. For example, processing circuitry may be configured to determine whether a characteristic value of a stimulation signal is within a range from a first threshold characteristic value to a second threshold characteristic value. In some examples, the characteristic value may include an amplitude of the stimulation signal, an amplitude of a portion of the stimulation signal, a slope of a portion of the stimulation signal, an area under a curve of at least a portion of the stimulation signal, or any combination thereof. In this way, sensing circuitry 206 may be configured to determine whether an amplitude of a portion of the stimulation signal is within a range from a first threshold amplitude value for the portion of the stimulation signal to a second threshold amplitude value for the portion of the stimulation signal, for example, but this is not required. The characteristic value may represent any measurable characteristic of a stimulation signal.

In addition to changing stimulation parameters in response to the patient state described above, responsive to determining that the characteristic value of the stimulation signal is not within a range from a first threshold characteristic value to a second threshold characteristic value, processing circuitry 210 may change one or more parameters which at least partially define one or more pulses deliverable by the stimulation generation circuitry after the stimulation signal as compared with the one or more parameters which at least partially define one or more pulses deliverable by the stimulation generation circuitry before the stimulation signal. In some examples, processing circuitry 210 may determine that the characteristic value is lower than the first threshold characteristic value.

Determining therapy based on one or more sensed signals may, in some cases, depend on a posture of patient 105. For example, processing circuitry 210 may be configured to determine a posture of patient 105 based on an acceleration signal generated by acceleration sensor 223. In some examples, the accelerometer signal includes a vertical component, a lateral component, and a frontal component corresponding to a vertical axis, a lateral axis, and a frontal axis, respectively. In this way, the accelerometer signal represents a three-dimensional measurement of acceleration. It may be beneficial for processing circuitry 210 to analyze one or more of the vertical axis, the lateral axis, and the frontal axis in order to determine a posture of patient 105. In some examples, to determine posture with sensors 222 may depend on calibration in the clinic e.g., after implant as well as during follow-up visits. The implant location may not be fully controlled and in some examples may even change over time within the patient.

Processing circuitry 210 may be configured to identify, based on signals from accelerometer 223, a posture of a set of postures which patient 105 is occupying. The set of postures may include, for example, a standing posture, a sitting posture, a supine posture, a prone posture, a side-lying posture, or any combination thereof. In some examples, expected parameter values of the accelerometer signal corresponding to each posture of the set of postures are stored in storage device 212.

In some examples, processing circuitry 210 is configured to determine, based on the accelerometer signal generated by sensor 223, a transition from a first posture to a second posture of the set of postures. In some examples, the second posture may indicate a particular patient state, e.g., a degree of distress, as described above. Responsive to determining the transition from the first posture to the second posture, processing circuitry 210 is configured to update the target stimulation signal value (e.g., the target range of characteristic values) for a respective sensed stimulation signal from a first target stimulation signal value to a second target stimulation signal value. In some examples, the detected change in posture may trigger the transition from a first target range to a second target range, but this is not required. In some cases, processing circuitry 102 may monitor the posture of patient 105 and the amplitude of stimulation pulses generated by stimulation generation circuitry 202 in real time or near real-time. Accordingly, processing circuitry 210 may set the range of target characteristic values for responsive stimulation signals in real time or near real-time.

Power source 224 is configured to deliver operating power to the components of IMD 201. Power source 224 may include a battery and a power generation circuit to produce the operating power. In some examples, the battery is rechargeable to allow extended operation. In some examples, recharging is accomplished through proximal inductive interaction between an external charger and an inductive charging coil within IMD 201. Power source 224 may include any one or more of a plurality of different battery types, such as nickel cadmium batteries and lithium ion batteries and may be implemented as a rechargeable or primary cell (non-rechargeable) battery.

Figure 3:
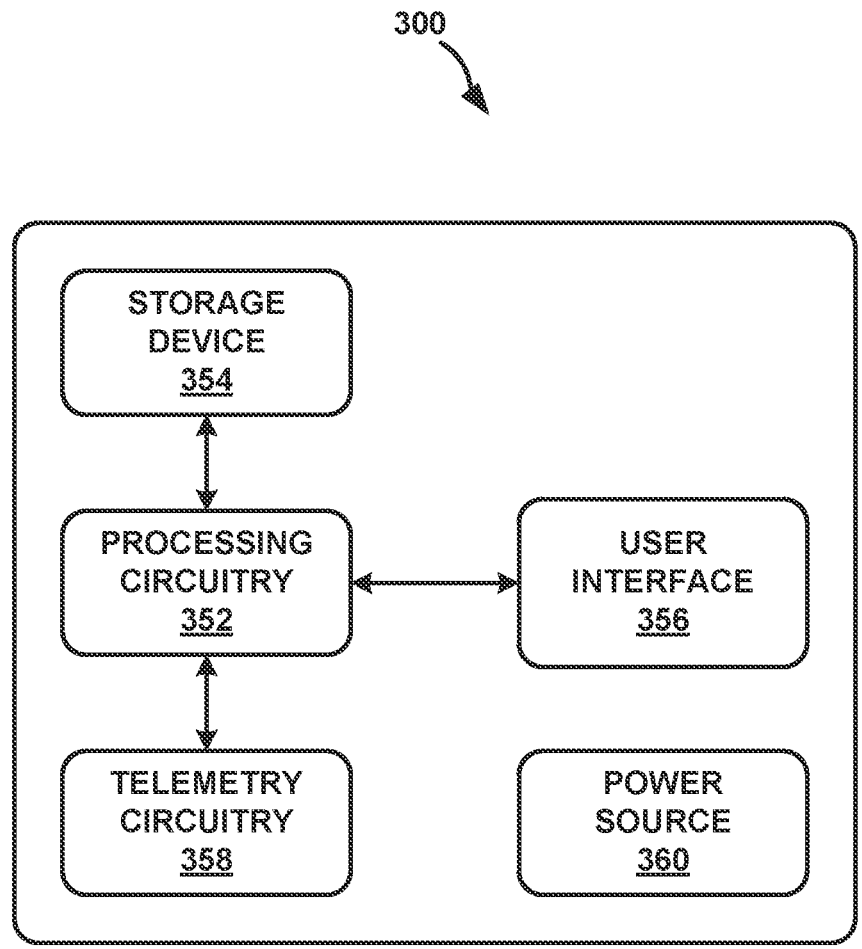
FIG. 3 is a block diagram illustrating an example configuration of components of the external programmer of FIG. 1, in accordance with one or more techniques of this disclosure.

FIG. 3 is a block diagram illustrating an example configuration of components of external programmer 300, in accordance with one or more techniques of this disclosure. External programmer 300 may be an example of external programmer 150 of FIG. 1. Although external programmer 300 may generally be described as a hand-held device, external programmer 300 may be a larger portable device or a more stationary device. In addition, in other examples, external programmer 300 may be included as part of an external charging device or include the functionality of an external charging device. As illustrated in FIG. 3, external programmer 300 may include processing circuitry 352, storage device 354, user interface 356, telemetry circuitry 358, and power source 360. Storage device 354 may store instructions that, when executed by processing circuitry 352, cause processing circuitry 352 and external programmer 300 to provide the functionality ascribed to external programmer 300 throughout this disclosure. Each of these components, circuitry, or modules, may include electrical circuitry that is configured to perform some, or all of the functionality described herein. For example, processing circuitry 352 may include processing circuitry configured to perform the processes discussed with respect to processing circuitry 352.

In general, external programmer 300 includes any suitable arrangement of hardware, alone or in combination with software and/or firmware, to perform the techniques attributed to external programmer 300, and processing circuitry 352, user interface 356, and telemetry circuitry 358 of external programmer 300. In various examples, external programmer 300 may include one or more processors, such as one or more microprocessors, DSPs, ASICs, FPGAs, or any other equivalent integrated or discrete logic circuitry, as well as any combinations of such components. External programmer 300 also, in various examples, may include a storage device 354, such as RAM, ROM, PROM, EPROM, EEPROM, flash memory, a hard disk, a CD-ROM, including executable instructions for causing the one or more processors to perform the actions attributed to them. Moreover, although processing circuitry 352 and telemetry circuitry 358 are described as separate modules, in some examples, processing circuitry 352 and telemetry circuitry 358 are functionally integrated. In some examples, processing circuitry 352 and telemetry circuitry 358 correspond to individual hardware units, such as ASICs, DSPs, FPGAs, or other hardware units.

Storage device 354 (e.g., a storage device) may store instructions that, when executed by processing circuitry 352, cause processing circuitry 352 and external programmer 300 to provide the functionality ascribed to external programmer 300 throughout this disclosure. For example, storage device 354 may include instructions that cause processing circuitry 352 to obtain a parameter set from memory, select a spatial electrode movement pattern, or receive a user input and send a corresponding command to IMD 201, or instructions for any other functionality. In addition, storage device 354 may include a plurality of programs, where each program includes a parameter set that defines stimulation pulses, such as control pulses and/or informed pulses. Storage device 354 may also store data received from a medical device (e.g., IMD 110). For example, storage device 354 may store stimulation signal and/or ECAP related data recorded at a sensing module of the medical device, and storage device 354 may also store data from one or more sensors of the medical device.

User interface 356 may include a button or keypad, lights, a speaker for voice commands, a display, such as a liquid crystal (LCD), light-emitting diode (LED), or organic light-emitting diode (OLED). In some examples the display includes a touch screen. User interface 356 may be configured to display any information related to the delivery of electrical stimulation, identified patient behaviors, sensed patient parameter values, patient behavior criteria, or any other such information. User interface 356 may also receive user input via user interface 356. The input may be, for example, in the form of pressing a button on a keypad or selecting an icon from a touch screen. The input may request starting or stopping electrical stimulation, the input may request a new spatial electrode movement pattern or a change to an existing spatial electrode movement pattern, of the input may request some other change to the delivery of electrical stimulation.

User interface 356 may receive inputs to set one or more thresholds for respiration activity, cardiac activity, biological impedance, posture, and other sensed signals. Comparing sensed signals to such thresholds may indicate a degree of distress, or other patient state, as described above in relation to FIG. 2. User interface 356 may also display one or more alerts, e.g., output by IMD 201, as shown in FIG. 2.

Telemetry circuitry 358 may support wireless communication between the medical device and external programmer 300 under the control of processing circuitry 352. Telemetry circuitry 358 may also be configured to communicate with another computing device via wireless communication techniques, or direct communication through a wired connection. In some examples, telemetry circuitry 358 provides wireless communication via an RF or proximal inductive medium. In some examples, telemetry circuitry 358 includes an antenna, which may take on a variety of forms, such as an internal or external antenna.

Examples of local wireless communication techniques that may be employed to facilitate communication between external programmer 300 and IMD 110 include RF communication according to the 802.11 or Bluetooth® specification sets or other standard or proprietary telemetry protocols. In this manner, other external devices may be capable of communicating with external programmer 300 without needing to establish a secure wireless connection. As described herein, telemetry circuitry 358 may be configured to transmit a spatial electrode movement pattern or other stimulation parameter values to IMD 110 for delivery of electrical stimulation therapy.

In some examples, selection of stimulation parameters for stimulation programs are transmitted to the medical device for delivery to a patient (e.g., patient 105 of FIG. 1). In other examples, the therapy may include medication, activities, or other instructions that patient 105 must perform themselves or a caregiver perform for patient 105. In some examples, external programmer 300 provides visual, audible, and/or tactile notifications that indicate there are new instructions. External programmer 300 requires receiving user input acknowledging that the instructions have been completed in some examples.

According to the techniques of the disclosure, user interface 356 of external programmer 300 receives an indication from a clinician instructing a processor of the medical device to update one or more stimulation programs. Updating therapy stimulation programs and test stimulation programs may include changing one or more parameters of the stimulation pulses delivered by the medical device according to the programs, such as amplitude, pulse width, frequency, and pulse shape of the informed pulses and/or control pulses. User interface 356 may also receive instructions from the clinician commanding any electrical stimulation, including control pulses and/or informed pulses to commence or to cease.

Power source 360 is configured to deliver operating power to the components of external programmer 300. Power source 360 may include a battery and a power generation circuit to produce the operating power. In some examples, the battery is rechargeable to allow extended operation. Recharging may be accomplished by electrically coupling power source 360 to a cradle or plug that is connected to an alternating current (AC) outlet. In addition, recharging may be accomplished through proximal inductive interaction between an external charger and an inductive charging coil within external programmer 300. In other examples, traditional batteries (e.g., nickel cadmium or lithium ion batteries) may be used. In addition, external programmer 300 may be directly coupled to an alternating current outlet to operate.

Figure 4:
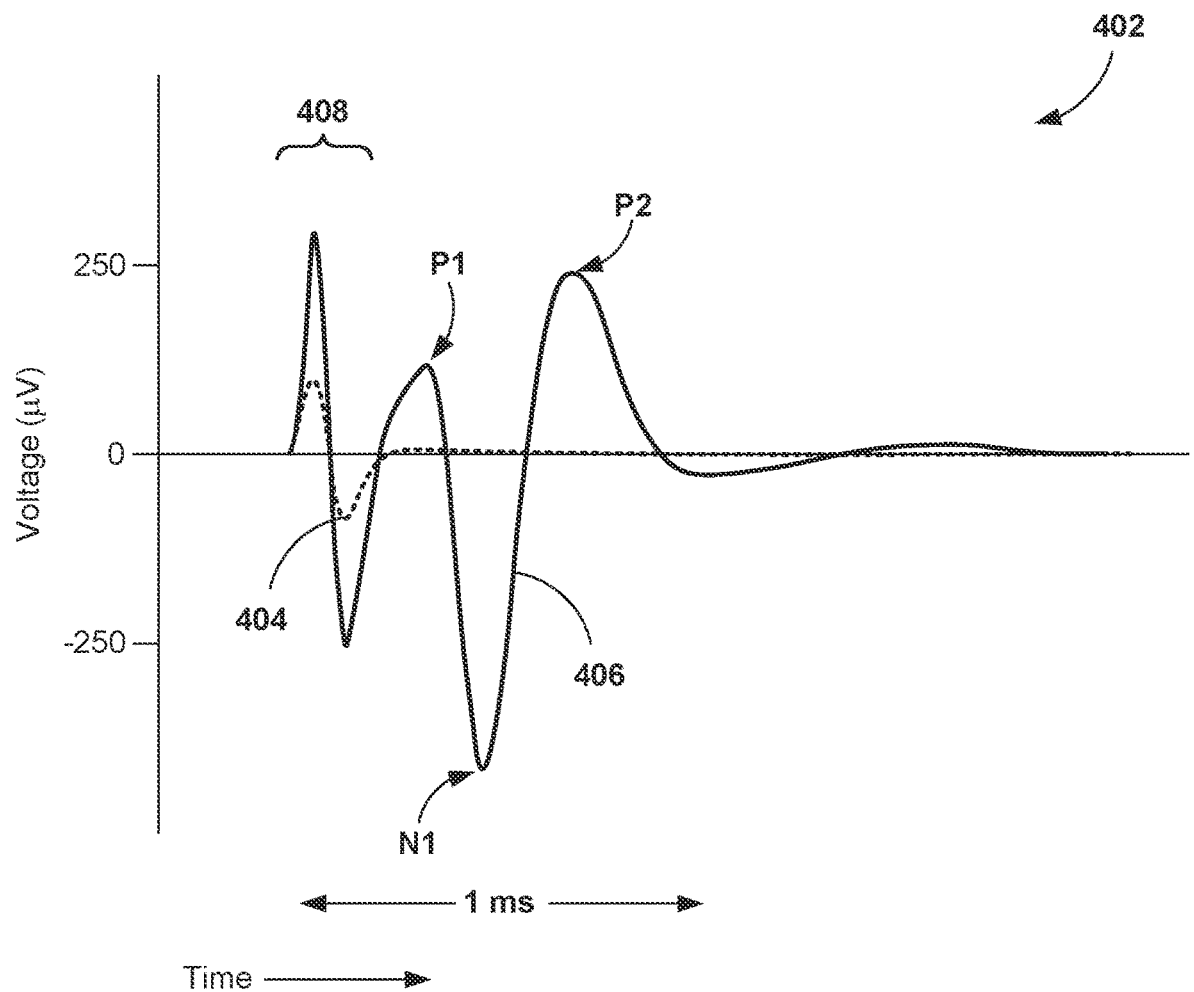
FIG. 4 is a graph of example evoked compound action potentials (ECAPs) sensed for respective stimulation pulses, in accordance with one or more techniques of this disclosure.

FIG. 4 is a graph of example evoked compound action potentials (ECAPs) sensed for respective stimulation pulses, in accordance with one or more techniques of this disclosure. As shown in FIG. 4, graph 402 shows example ECAP signal 404 (dotted line) and ECAP signal 406 (solid line). In some examples, each of ECAP signals 404 and 406 are sensed from stimulation pulses (e.g., a control pulse) that were delivered from a guarded cathode, where the stimulation pulses are bi-phasic pulses including an interphase interval between each positive and negative phase of the pulse. In some such examples, the guarded cathode includes stimulation electrodes located at the end of an 8-electrode lead (e.g., leads 130 of FIG. 1) while two sensing electrodes are provided at the other end of the 8-electrode lead. ECAP signal 404 illustrates the voltage amplitude sensed as a result from a sub-detection threshold stimulation pulse, or a stimulation pulse which results in no detectable ECAP. In other examples, stimulation circuitry of the IMD, e.g., stimulation circuitry 202 described above in relation to FIG. 2, may deliver monophasic, tri-phasic, or pulses with another quantity of phases.

Sensing circuitry of the IMD may detect peaks 408 of ECAP signal 404, via electrodes 232 and 234 of FIG. 2, and represent stimulation signals of the delivered stimulation pulse. However, no propagating signal is detected after the stimulation signal in ECAP signal 404 because the stimulation pulse had an intensity (e.g., an amplitude and/or pulse width) that was "sub-threshold" or below a detection threshold (e.g., a sub-detection threshold) and/or below a propagation threshold (e.g., a sub-propagation threshold).

In contrast to ECAP signal 404, ECAP signal 406 represents the voltage amplitude detected from a supra-detection stimulation threshold stimulation pulse. Peaks 408 of ECAP signal 406 are detected and represent stimulation signals of the delivered stimulation pulse. After peaks 408, ECAP signal 406 also includes peaks P1, N1, and P2, which are three typical peaks representative of propagating action potentials from an ECAP. The example duration of the stimulation signal and peaks P1, N1, and P2 is approximately 1 millisecond (ms).

When detecting the ECAP of ECAP signal 406, different characteristics may be identified. For example, the characteristic of the ECAP may be the amplitude between N1 and P2. This N1-P2 amplitude may be easily detectable even if the stimulation signal impinges on P1, a relatively large signal, and the N1-P2 amplitude may be minimally affected by electronic drift in the signal. In other examples, the characteristic of the ECAP used to control subsequent stimulation pulses (e.g., control pulses and/or informed pulses) may be an amplitude of P1, N1, or P2 with respect to neutral or zero voltage. In some examples, the characteristic of the ECAP used to control subsequent stimulation pulses is a sum of two or more of peaks P1, N1, or P2. In other examples, the characteristic of ECAP signal 406 may be the area under one or more of peaks P1, N1, and/or P2. In other examples, the characteristic of the ECAP may be a ratio of one of peaks P1, N1, or P2 to another one of the peaks. In some examples, the characteristic of the ECAP is a slope between two points in the ECAP signal, such as the slope between N1 and P2. In other examples, the characteristic of the ECAP may be the time between two points of the ECAP, such as the time between N1 and P2.

The time between when the stimulation pulse is delivered and a point in the ECAP signal may be referred to as a latency of the ECAP and may indicate the types of fibers being captured by the stimulation pulse (e.g., a control pulse). ECAP signals with lower latency (i.e., smaller latency values) indicate a higher percentage of nerve fibers that have faster propagation of signals, whereas ECAP signals with higher latency (i.e., larger latency values) indicate a higher percentage of nerve fibers that have slower propagation of signals. Latency may also refer to the time between an electrical feature is detected at one electrode and then detected again at a different electrode. This time, or latency, is inversely proportional to the conduction velocity of the nerve fibers. Other characteristics of the ECAP signal may be used in other examples.

The amplitude of the ECAP signal increases with increased amplitude of the stimulation pulse, as long as the pulse amplitude is greater than threshold such that nerves depolarize and propagate the signal. The target ECAP characteristic (e.g., the target ECAP amplitude) may be determined from the ECAP signal detected from a stimulation pulse (or a control pulse) when informed pulses are determined to deliver effective therapy to patient 105. The ECAP signal thus is representative of the distance between the stimulation electrodes and the nerves appropriate for the stimulation parameter values of the informed pulses delivered at that time. Therefore, IMD 110 may attempt to use detected changes to the measured ECAP characteristic value to change therapy pulse parameter values and maintain the target ECAP characteristic value during therapy pulse delivery.

Figure 5:
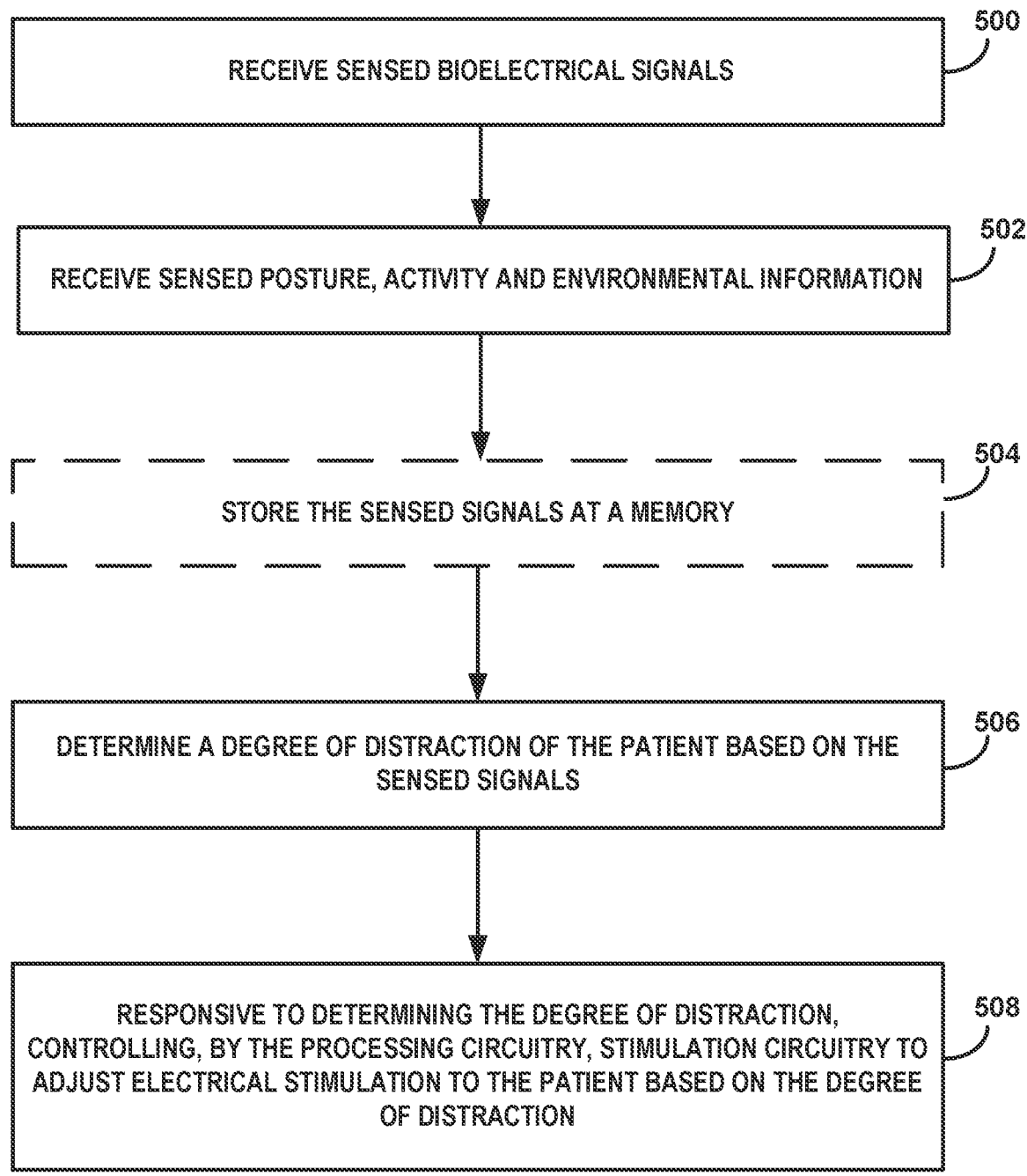
FIG. 5 is a flowchart illustrating an example operation of the system of this disclosure to determine a degree of distraction of a patient according to one or more techniques of this disclosure.

FIG. 5 is a flowchart illustrating an example operation of the system of this disclosure to determine a degree of distraction for a patient. The steps of FIG. 5 will be described in terms of FIG. 2, unless otherwise noted.

Processing circuitry 210, located within the housing of IMD 201, may receive sensed signals including bioelectrical signals from sensing circuitry 206 via electrodes 232 and 234 on leads 230 (500). As described above in relation to FIG. 1 leads 230 are configured to be implanted such that electrodes 232 and 234 is proximal to spinal cord 120 of a patient 105. In other examples, one or more electrodes are located on the housing of IMD 110 or at a location other than proximal to spinal cord 120, e.g., on lead 132.

Processing circuitry 210 may also receive sensed signals indicative of patient posture and patient activity information from one or more accelerometers 223 located within the housing of IMD 201 (502). In other examples, processing circuitry 210, or other processing circuitry of system 200, may receive signals from other sensors external to IMD 201, as described above in relation to FIGS. 1 and 2.

In some examples, processing circuitry 210 may store the sensed signals at a memory location, e.g., sensed signals 216, as described above in relation to FIG. 2 (504). In other examples, processing circuitry 210 may analyze and respond to the sensed signals and information without storing the signals at a memory.

Processing circuitry 210, or other processing circuitry of system 200, may determine a degree of distraction of the patient, e.g., based on the sensed signals (506). For example, the processing circuitry may determine a higher level of distraction for a patient at rest, in a seated position, in a room with the sounds and lights from a television, or other entertainment. In some examples, a patient moving in a vehicle, e.g., based on sounds, posture, GPS information from a wearable or handheld device may be distracted, e.g., if driving. In other examples, a patient moving in a vehicle, such as a bus, train or aircraft may not be distracted. In some examples, the processing circuitry may determine the degree of distraction based on information for an individual patient. Responsive to determining the degree of distraction processing circuitry 210 may control stimulation circuitry 202 to adjust electrical stimulation to the patient based on the degree of distraction (508).

Figure 6:
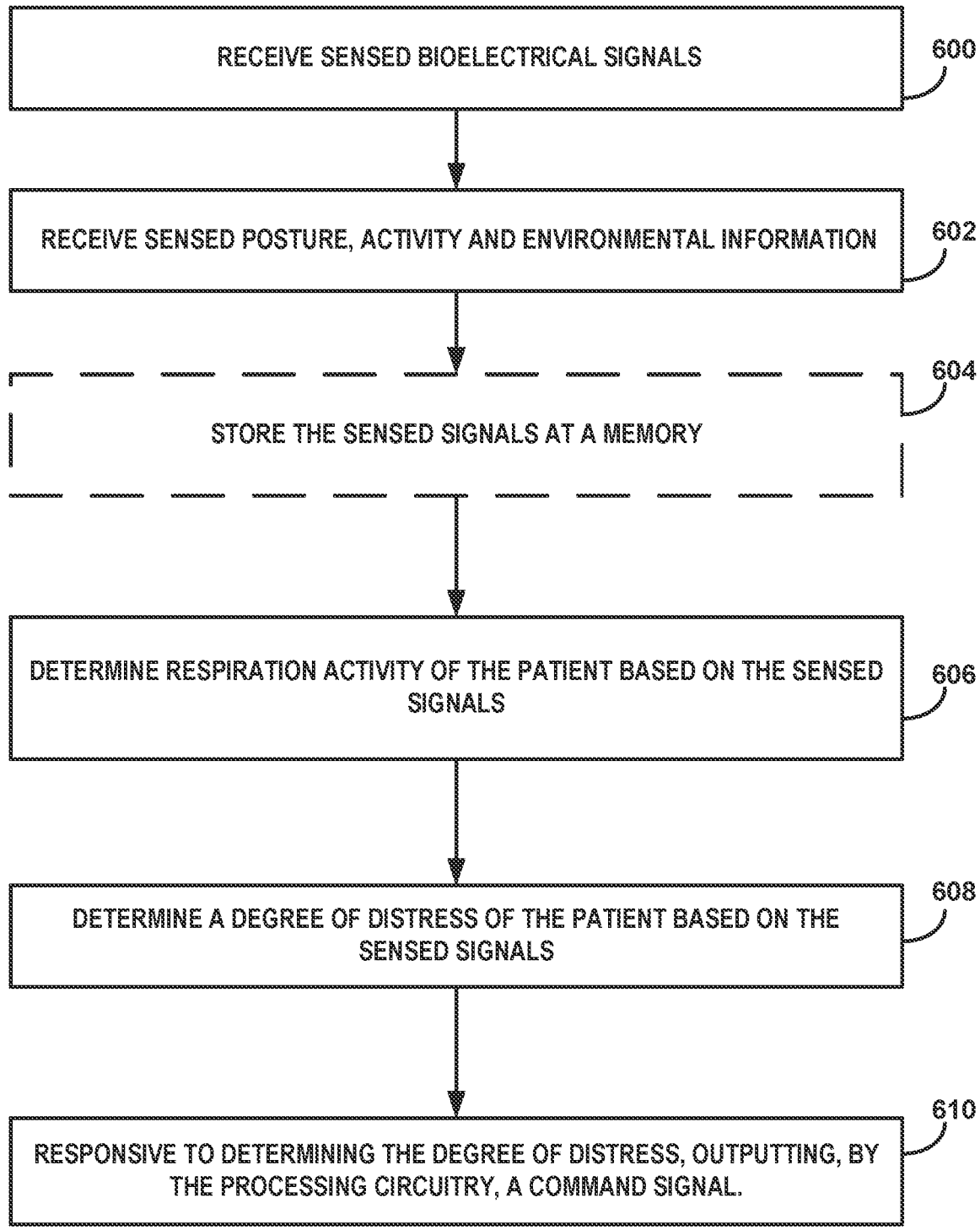
FIG. 6 is a flow chart illustrating an example operation of the system of this disclosure to determine a degree of distress of a patient according to one or more techniques of this disclosure.

FIG. 6 is a flowchart illustrating an example operation of the system of this disclosure to determine a degree of distress for a patient. The steps of FIG. 6 will be described in terms of FIG. 2, unless otherwise noted.

Similar to the example of FIG. 5, processing circuitry 210, located within the housing of IMD 201, may receive sensed signals including bioelectrical signals from sensing circuitry 206 via electrodes 232 and 234 on leads 230 (600). Processing circuitry 210 may also receive sensed signals indicative of patient posture and patient activity information from one or more accelerometers 223 located within the housing of IMD 201 (602). In some examples, processing circuitry 210 may store the sensed signals at a memory location, e.g., sensed signals 216, as described above in relation to FIG. 2 (604).

Processing circuitry of system 200 may determine respiration activity of the patient based on the sensed signals (606). Processing circuitry 210, or other processing circuitry of system 200, may determine a degree of distress of the patient, e.g., based on the sensed signals, and in some examples, also based on the determined respiration activity (608). For example, the processing circuitry may determine a higher degree of distress for a patient in a distress posture, e.g., seated or standing with elbows or hands on knees, fast respiration, rapid cardiac rhythm, or other similar indications. Responsive to determining the degree of distress, processing circuitry 210 may output a command signal, such as a signal to communication circuitry 208 to output an alert, to stimulation circuitry 202 to adjust the electrical stimulation output or for other purposes, described above (610).

Figure 7:
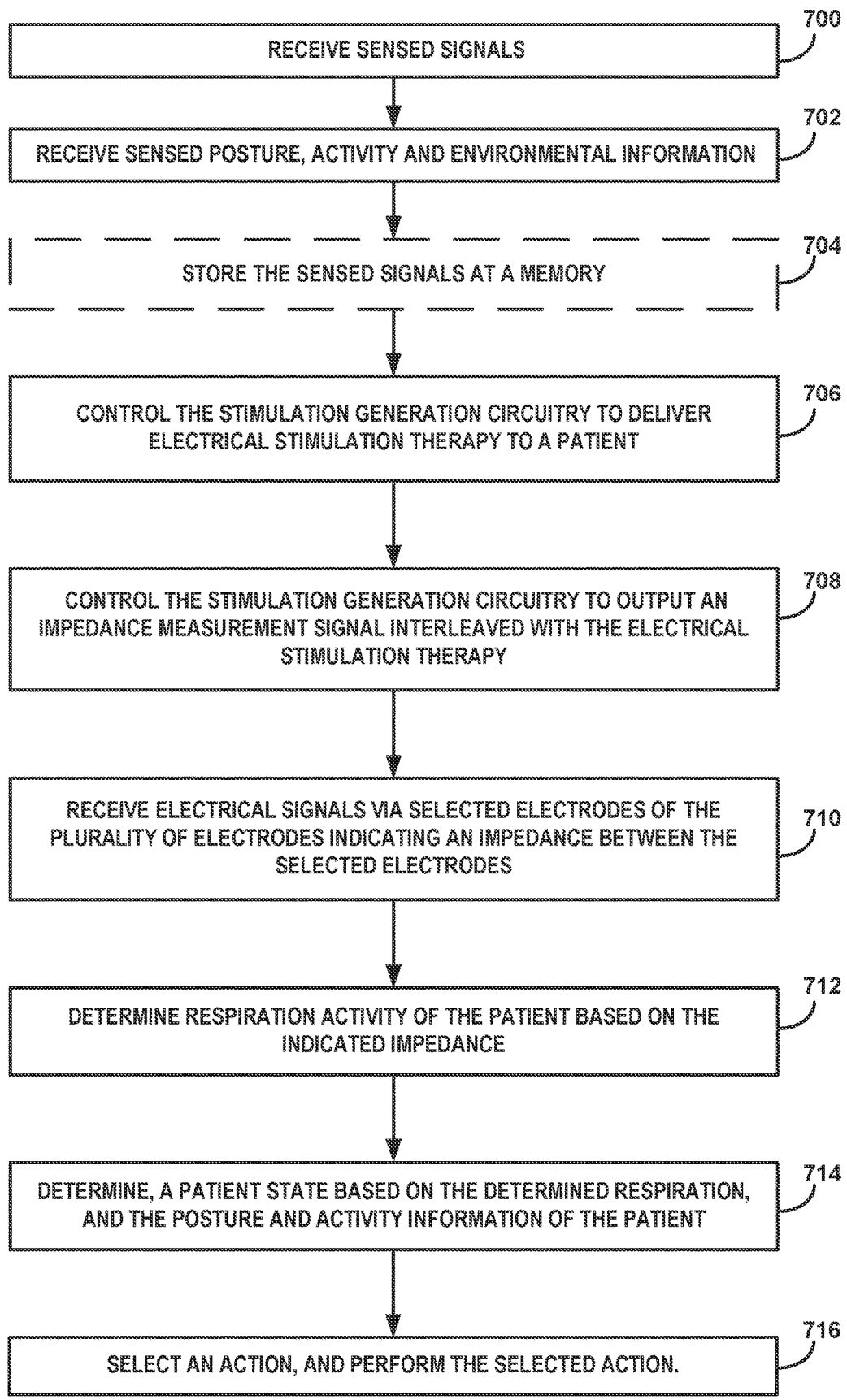
FIG. 7 is a flowchart illustrating an example operation of the system of this disclosure to interleave bioelectrical signal collection with electrical stimulation therapy according to one or more techniques of this disclosure.

FIG. 7 is a flowchart illustrating an example operation of the system of this disclosure to interleave bioelectrical signal collection with electrical stimulation therapy according to one or more techniques of this disclosure. The steps of FIG. 7 will be described in terms of FIG. 2, unless otherwise noted.

Similar to the example of FIGS. 5 and 6, processing circuitry 210, located within the housing of IMD 201, may receive sensed signals including bioelectrical signals from sensing circuitry 206 via electrodes 232 and 234 on leads 230 (700). Processing circuitry 210 may also receive sensed signals indicative of patient posture and patient activity information from one or more accelerometers 223 located within the housing of IMD 201 (702). In some examples, processing circuitry 210 may store the sensed signals at a memory location, e.g., sensed signals 216, as described above in relation to FIG. 2 (704).

Processing circuitry 210 may control stimulation generation circuitry 202, as well as switch circuitry 204, to deliver electrical stimulation therapy to patient 105 shown in FIG. 1 (706). Processing circuitry 210 may control sensing circuitry 206, and switch circuitry 204 to interleave electrical stimulation therapy to patient 105 with sensing bioelectrical signals from patient 105. As described above in relation to FIG. 1, in some examples, switching circuitry 204 may be configured by processing circuitry 210 to output the stimulation therapy on different electrodes, or combinations of electrodes, than the electrodes used for sensing. In other examples, the same electrodes may be used for both sensing and therapy delivery.

In some examples, processing circuitry 210 may also control stimulation generation circuitry 202 to output an impedance measurement signal interleaved with the electrical stimulation therapy (708). As with the sensing, in some examples IMD 201 may output the impedance measurement signal on electrodes different from the electrodes used for therapy delivery. In other examples, the same electrodes may output the therapy stimulation as well as the impedance measurement signal. In other words, stimulation circuitry 202 may output a signal configured to determine changes in thoracic impedance, interleaved with electrical stimulation therapy delivered to patient tissue proximal to spinal cord 120, depicted in FIG. 1. Processing circuitry 210 may receive electrical signals from sensing circuitry 206 via selected electrodes of the plurality of electrodes 232 and 234, indicating the impedance measured by the selected electrodes (710).

Processing circuitry 210 may determine respiration activity of the patient based on the indicated impedance (712), e.g., the indication of thoracic impedance from sensing circuitry 206. Respiration activity measurements may be stored at sensed signals 216, or other memory location of system 200, and may include a respiration rate, the depth of respiration, e.g., shallow breathing, and other indications of respiration activity.

Responsive to determining the respiration of the patient, processing circuitry 210 may determine a patient state based on the determined respiration, along with the posture and activity information of the patient (714). Examples of patient state may include standing, sitting, relaxed, under stress, active, at rest, and similar states. In some examples, the processing circuitry may also determine the patient situation, which may include the patient state, as well as the environment for the patient, as described above in relation to FIG. 1. The environment may include quiet, noisy, light, dark, moving in a vehicle, warm, cold, in a room with a television, and similar environmental factors.

Responsive to determining the patient state, processing circuitry 210 may select an action (716). Some examples of an action may include one or more of: storing collected information, uploading the collected information to an external computing device, and outputting an electronic signal comprising an alert, adjusting the therapy deliver, taking additional measurements, for example, at specified intervals, requesting information from other devices, e.g., wearable devices 122 or 126, from medical device 123 or some other sensor, and other similar actions. Finally, processing circuitry 210 may perform the selected action, or actions (716).

In one or more examples, the functions described above may be implemented in hardware, software, firmware, or any combination thereof. For example, the various components of FIGS. 1, 2 and 3, such as processing circuitry 210, servers 152, communication circuitry 208, and processing circuitry 352 may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The term "non-transitory" may indicate that the storage medium is not embodied in a carrier wave or a propagated signal. In certain examples, a non-transitory storage medium may store data that can, over time, change (e.g., in RAM or cache). By way of example, and not limitation, such computer-readable storage media, may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor" and "processing circuitry," as used herein, may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1: An implantable medical device comprising: a memory configured to store sensed signals; one or more accelerometers configured to determine posture and activity information of the patient for storage as part of the sensed signals; stimulation circuitry configured to deliver electrical stimulation to the patient via a first set of a plurality of electrodes configured to be implanted proximal to a spinal cord of the patient; sensing circuitry configured to sense electrical signals via a second set of electrodes for storage as part of the sensed signals; and processing circuitry operably coupled to the memory, the processing circuitry configured to: receive the sensed signals, wherein the received sensed signals comprise: the electrical signals sensed via the second set of plurality of electrodes, and the posture and activity information determined by the one or more accelerometers; determine a degree of distraction of the patient based on the sensed signals; responsive to determining the degree of distraction, control the stimulation circuitry to adjust the electrical stimulation to the patient.

Example 2: The device of example 1, wherein the processing circuitry is configured to analyze the electrical signals and based on the analyzed signals, determine for the patient: a respiration rate, cardiac rhythm, and biological impedance.

Example 3: The device of claims 1 and 2, wherein the one or more sensors comprise any one or more of: accelerometers, gyroscopes, global positioning sensors, magnetometers, or other position and movement sensors.

Example 4: The device of claims 1-3, wherein the first set of electrodes and the second set of electrodes comprise electrodes integral to or mounted on a housing of the implantable medical device.

Example 5: The device of any of examples 1-4, wherein the processing circuitry is configured to: determine whether the degree of distraction satisfies a distraction threshold; and in response to determining that the degree of distraction satisfies the distraction threshold, control the stimulation circuitry to output a control pulse that elicits an ECAP response.

Example 6: The device of any of examples 1 through 5, wherein the processing circuitry is further configured to determine the degree of distraction based at least in part on the time of day.

Example 7: The device of any of examples 1 through 6, wherein the received the sensed signals comprise signals from sensors external to the device.

Example 8: The device of any of examples 1 through 7, wherein, the processing circuitry is configured to: determine whether the degree of distraction satisfies a distraction threshold; and responsive to determining the degree of distraction satisfies a distraction threshold, control the stimulation circuitry to reduce the output power of the electrical stimulation therapy.

Example 9: The device of any of examples 1 through 8, wherein an implantable lead coupled to the implantable medical device comprises: the first set of a plurality of electrodes; and the second set of electrodes, wherein the second set of electrodes are configured to be implanted such that the electrodes are proximal to a spinal cord of a patient.

Example 10: A system comprising: an implantable lead comprising a plurality of electrodes, the lead configured to be implanted proximal to a spinal cord of a patient; and an implantable medical device, the device comprising: a memory configured to store sensed signals; one or more accelerometers configured to determine posture and activity information of the patient for storage as part of the sensed signals; stimulation circuitry configured to deliver electrical stimulation to the patient via one or more electrodes of the plurality of electrodes; and processing circuitry operably coupled to the memory, the processing circuitry configured to: receive the sensed signals, wherein the received sensed signals comprise: electrical signals sensed via one or more electrodes of the plurality of electrodes, and posture and activity information determined by the one or more accelerometers; determine a degree of distraction of the patient based on the received sensed signals; responsive to determining the degree of distraction, control the stimulation circuitry to adjust the electrical stimulation to the patient.

Example 11: The system of example 10, wherein the processing circuitry is configured to analyze the electrical signals and based on the analyzed signals determine for the patient: a respiration rate, cardiac rhythm, and biological impedance.

Example 12: The system of any of examples 10 and 11, wherein, the processing circuitry is configured to: determine whether the degree of distraction satisfies a distraction threshold; and in response to determining the degree of distraction satisfies a distraction threshold, the processing circuitry is further configured to control the stimulation circuitry to output a control pulse that elicits an ECAP response.

Example 13: The system of any of examples 10 through 12, wherein the processing circuitry is configured to determine a type of distraction based on the received sensed signals.

Example 14: The system of any of examples 10 through 13, wherein the received the sensed signals comprise signals from external sensors.

Example 15: The system of any of examples 10 through 14, wherein, the processing circuitry is configured to: determine whether the degree of distraction satisfies a distraction threshold; and responsive to determining the degree of distraction satisfies a distraction threshold, the processing circuitry is further configured to control the stimulation circuitry to reduce the output power of the electrical stimulation therapy.

Example 16: A method for operating an implantable medical device comprising: receiving, by processing circuitry located within a housing of the medical device, sensed signals, wherein the sensed signals comprise: electrical signals received by sensing circuitry via one or more electrodes of a plurality of electrodes on an implantable lead coupled to the implantable medical device, the lead configured to be implanted such that the plurality of electrodes are proximal to a spinal cord of a patient; and signals indicative of patient posture and patient activity information from one or more accelerometers located within the housing of the implantable medical device; determining, by the processing circuitry, a degree of distraction of the patient based on the sensed signals; responsive to determining the degree of distraction, controlling, by the processing circuitry, stimulation circuitry to adjust electrical stimulation to the patient based on the degree of distraction, wherein the stimulation circuitry is configured to deliver electrical stimulation to the patient via the plurality of electrodes.

Example 17: The method of example 16, further comprising: a respiration rate, cardiac rhythm, and biological impedance based on analyzing the electrical signals received via the one or more electrodes.

Example 18: The method of any of examples 16 and 17, further comprising: determining whether the degree of distraction satisfies a distraction threshold; and in response to determining the degree of distraction satisfies a distraction threshold, controlling, by the processing circuitry, the stimulation circuitry to output a control pulse that elicits an ECAP response.

Example 19: The method of any of examples 16 through 18, further comprising, determining, by the processing circuitry, a type of distraction based on the received sensed signals.

Example 20: The method of any of examples 16 through 19, wherein the received the sensed signals further comprise signals from sensors external to the system.

Example 21: The method of any of examples 16 through 20, further comprising: determining whether the degree of distraction satisfies a distraction threshold; and responsive to determining the degree of distraction satisfies a distraction threshold, controlling, by the processing circuitry, the stimulation circuitry to reduce the output power of the electrical stimulation therapy.

Example 22: An implantable medical device comprising: a memory configured to store sensed signals; one or more accelerometers configured to determine posture and activity information of the patient for storage as part of the sensed signals; stimulation circuitry configured to deliver electrical stimulation to a patient via a first set of a plurality of electrodes implanted proximal to a spinal cord of the patient; sensing circuitry configured to sense electrical signals via a second set of electrodes for storage as part of the sensed signals; and processing circuitry operably coupled to the memory, the processing circuitry configured to: receive the sensed signals, wherein the sensed signals comprise: electrical signals via one or more electrodes of the plurality of electrodes, and the posture and activity information determined by the one or more accelerometers; determine respiration activity of the patient based on the sensed signals; determine a degree of distress of the patient based on the sensed signals and the determined respiration activity; responsive to determining the degree of distress, output a command signal.

Example 23: The device of example 22, wherein to output the command signal, the processing circuitry is configured to output the command signal to the stimulation circuitry, and wherein the command signal causes the stimulation circuitry to adjust the delivery of the electrical stimulation to the patient based on the degree of distress.

Example 24: The device of any of examples 22 and 23, wherein to output the command signal, the processing circuitry is configured to output the command signal to communication circuitry, and wherein the command signal causes the communication circuitry to send an electronic message comprising a notification of the degree of distress of the patient.

Example 25: The device of any of examples 22 through 24, wherein an implantable lead coupled to the implantable medical device comprises: the first set of a plurality of electrodes; and the second set of electrodes, wherein the second set of electrodes are configured to be implanted such that the electrodes are proximal to a spinal cord of a patient.

Example 26: The device of any of examples 22 through 25, wherein to output the command signal, the processing circuitry is configured to output the command signal to communication circuitry, and wherein the command signal causes a second medical device separate from the device to change an operation based on the degree of distress.

Example 27: The device of example 27, wherein the second medical device is a drug pump, and wherein the change of operation comprises a change in drug dosage to the patient.

Example 28: The device of any of examples 22 through 27, wherein the processing circuitry is configured to analyze the electrical signals and based on the analyzed signals determine for the patient: a respiration rate, cardiac rhythm, and biological impedance.

Example 29: The device of any of examples 22 through 29, wherein the received the sensed signals comprise signals from sensors external to the device.

Example 30: The device of any of examples 22 through 29, wherein the processing circuitry is configured to: detect a predetermined posture; and determine the degree of distress based on detecting the predetermined posture.

Example 31: A system comprising: an implantable lead a plurality of electrodes, the lead configured to be implanted proximal to a spinal cord of a patient; and an implantable medical device, the device comprising: a memory configured to store sensed signals; one or more accelerometers configured to determine posture and activity information of the patient for storage as part of the sensed signals; stimulation circuitry configured to deliver electrical stimulation to the patient via the plurality of electrodes; sensing circuitry configured to sense electrical signals the plurality of electrodes for storage as part of the sensed signals; and processing circuitry operably coupled to the memory, the processing circuitry configured to: receive the sensed signals, wherein the sensed signals comprise: the electrical signals sensed via one or more electrodes of the plurality of electrodes, and the posture and activity information determined by the one or more accelerometers; determine respiration activity of the patient based on the sensed signals; determine a degree of distress of the patient based on the sensed signals and the determined respiration activity; responsive to determining the degree of distress, output a command signal.

Example 32: The system of example 30, wherein to output the command signal, the processing circuitry is configured to output the command signal to the stimulation circuitry, and wherein the command signal causes the stimulation circuitry to adjust the delivery of electrical stimulation to the patient based on the degree of distress.

Example 33: The system of any of examples 30 and 32, wherein to output the command signal, the processing circuitry is configured to output the command signal to the communication circuitry, and wherein the command signal causes the communication circuitry to send an electronic message comprising a notification of the degree of distress of the patient.

Example 34: The system of example 33, wherein the electronic message is configured to notify a caregiver regarding the degree of distress of the patient.

Example 35: The system of any of examples 30 through 34, wherein the output circuit comprises the communication circuitry, and wherein the command signal causes a second medical device separate from the device to change an operation based on the degree of distress.

Example 36: The system of example 35, wherein the second medical device is a drug pump, and wherein the change of operation comprises a change in drug dosage to the patient.

Example 37: The system of any of examples 30 through 36, wherein the processing circuitry is configured to analyze the electrical signals sensed via the one or more electrodes and based on the analyzed signals determine for the patient: a respiration rate, cardiac rhythm, and biological impedance.

Example 38: The system of any of examples 30 through 37, wherein the received the sensed signals comprise signals from sensors external to the device.

Example 39: The system of any of examples 30 through 38, wherein the processing circuitry is configured to: detect a predetermined posture; and determine the degree of distress based on detecting the predetermined posture.

Example 40: A method for operating an implantable medical device comprising: receiving, by processing circuitry located within a housing of the medical device, sensed signals, wherein the sensed signals comprise: electrical signals received by sensing circuitry via one or more electrodes of a plurality of electrodes on an implantable lead coupled to the implantable medical device, the lead configured to be implanted such that the electrodes are proximal to a spinal cord of a patient; and signals indicative of patient posture and patient activity information from one or more accelerometers located within the housing of the implantable medical device; storing the sensed signals at a memory device operatively coupled to the processing circuitry; determining respiration activity of the patient based on the sensed signals; determining a degree of distress of the patient based on the sensed signals and the determined respiration activity; responsive to determining the degree of distress, outputting, by the processing circuitry, a command signal.

Example 41: The method of example 40, wherein outputting the command signal comprises outputting the command signal to the stimulation circuitry, wherein the command signal causes the stimulation circuitry to adjust the delivered electrical stimulation to the patient based on the degree of distress.

Example 42: The method of any of examples 40 and 41, wherein outputting the command signal comprises outputting the command signal to communication circuitry, and wherein the command signal causes the communication circuitry to send an electronic message comprising a notification of the degree of distress of the patient.

Example 43: The method of example 42, wherein the electronic message is configured to notify a caregiver regarding the degree of distress of the patient.

Example 44: The method of any of examples 40 through 43, wherein outputting the command signal comprises outputting the command signal to communication circuitry, and wherein the command signal causes a second medical device separate from the device to change an operation based on the degree of distress.

Example 45: The method of example 44, wherein the second medical device is a drug pump, and wherein the change of operation comprises a change in drug dosage to the patient.

Example 46: The method of any of examples 40 through 45, further comprising: analyzing, by the processing circuitry, the electrical signals; and based on the analyzed signals determining for the patient: a respiration rate, cardiac rhythm, and biological impedance.

Example 47: The method of any of examples 40 through 46, wherein the received the sensed signals comprise signals from sensors external to the device.

Example 48: The method of any of examples 40 through 47, further comprising detect, by the processing circuitry, a predetermined posture; and determining, by the processing circuitry, the degree of distress based on detecting the predetermined posture.

Example 49: An implantable medical device comprising: a memory configured to store sensed signals; one or more accelerometers configured to determine posture and activity information of a patient for storage as part of the sensed signals; stimulation generation circuitry configured to deliver electrical stimulation therapy to the patient via first set of a plurality of electrodes configured to be implanted proximal to a spinal cord of the patient; sensing circuitry configured to sense bioelectrical signals via a second set of electrodes for storage as part of the sensed signals; and processing circuitry operably coupled to the memory, the processing circuitry configured to: control the stimulation generation circuitry to deliver the electrical stimulation therapy to a patient: interleaved with the electrical stimulation therapy, control the stimulation generation circuitry to output an impedance measurement signal; receive bioelectrical signals via selected electrodes of the second set of electrodes indicating an impedance between the selected electrodes, determine respiration of the patient based on the impedance; and responsive to determining the respiration of the patient, determine a patient state based on the determined respiration, and the posture and activity information of the patient, responsive to determining the patient state, select an action, wherein the selected action comprises one or more of: store collected information, upload the collected information to an external computing device, and output an electronic signal comprising an alert; and perform the selected action.

Example 50: The device of example 49, wherein the patient state comprises a sleep apnea episode, and wherein the output electronic signal from the implantable medical device is configured to wake the patient.

Example 51: The device of any of examples 49 and 50, wherein the selected action further comprises to control the stimulation therapy to adjust the electrical stimulation therapy to the patient.

Example 52: The device of example 51, wherein to output the electronic signal, the processing circuitry is configured to control the stimulation generation circuitry to deliver a control pulse configured to elicit an evoked compound action potentials (ECAP) signal perceptible to the patient as the alert.

Example 53: The device of any of examples 49 through 52, wherein the processing circuitry is further configured to: receive sensor data related to the patient state from one or more sensors external to the device, and determine the patient state based on: the received sensor data from the one or more sensors external to the device; and the determined respiration, and the posture and activity information of the patient from the one or more accelerometers.

Example 54: The device of any of examples 49 through 53, wherein the processing circuitry is further configured to: receive bioelectrical signals via electrodes of the plurality of electrodes, interleaved with the electrical stimulation therapy, indicating a cardiac rhythm of the patient; and determine the patient state based on the indicated cardiac rhythm of the patient, and based on the determined respiration, and the posture and activity information of the patient.

Example 55: The device of any of examples 49 through 54, wherein the selected action comprises to upload collected information for one or more of a sleep study or a mobility study to an external computing device.

Example 56: The device of any of examples 49 through 55, wherein the processing circuitry is further configured to determine the patient state based at least in part on the time of day.

Example 57: The device of any of examples 49 through 56, wherein an implantable lead coupled to the implantable medical device comprises: the first set of a plurality of electrodes; and the second set of electrodes, wherein the second set of electrodes are configured to be implanted such that the electrodes are proximal to a spinal cord of a patient.

Example 58: A system comprising: an implantable lead comprising a plurality of electrodes, the lead configured to be implanted proximal to a spinal cord of a patient; and an implantable medical device, the device comprising: a memory configured to store sensed signals; one or more accelerometers configured to determine posture and activity information of a patient for storage as part of the sensed signals; stimulation generation circuitry configured to deliver electrical stimulation therapy to the patient via a plurality of electrodes; sensing circuitry configured to sense bioelectrical signals via the plurality of electrodes for storage as part of the sensed signals; and processing circuitry operably coupled to the memory, the processing circuitry configured to: control the stimulation generation circuitry to deliver the electrical stimulation therapy to a patient: interleaved with the electrical stimulation therapy, control the stimulation generation circuitry to output an impedance measurement signal; receive bioelectrical signals via selected electrodes of the plurality of electrodes indicating an impedance between the selected electrodes, determine respiration of the patient based on the impedance; and responsive to determining the respiration of the patient, determine a patient state based on the determined respiration, and the posture and activity information of the patient, responsive to determining the patient state, select an action, wherein the selected action comprises one or more of: store collected information, upload the collected information to an external computing device, output an electronic signal comprising an alert; and perform the selected action.

Example 59: The system of example 58, wherein the patient state comprises a sleep apnea episode, and wherein the output electronic signal from the implantable medical device is configured to wake the patient.

Example 60: The system of any of examples 58 and 59, wherein the selected action further comprises to adjust the electrical stimulation therapy to the patient.

Example 61: The system of example 60, wherein to output electronic signal, the processing is configured to control the stimulation generation circuitry to deliver a control pulse configured to elicit an evoked compound action potentials (ECAP) signal perceptible to the patient as the alert.

Example 62: The system of any of examples 58 through 61, wherein the processing circuitry is further configured to: receive sensor data related to the patient state from one or more sensors external to the device, and determine the patient state based on: the received sensor data from the one or more sensors external to the device; and the determined respiration, and the posture and activity information of the patient from the one or more accelerometers.

Example 63: The system of any of examples 58 through 62, wherein the processing circuitry is further configured to: receive bioelectrical signals via the plurality of electrodes, interleaved with the electrical stimulation therapy, indicating a cardiac rhythm of the patient; and determine the patient state based on the indicated cardiac rhythm of the patient, as well as based on the determined respiration, and posture and activity information of the patient.

Example 64: The system of any of examples 58 through 63, wherein the selected action comprises to upload collected information for a sleep study to an external computing device.

Example 65: The system of any of examples 58 through 64, wherein the selected action comprises to upload collected information for a mobility study to an external computing device.

Example 66: A method for operating an implantable medical device comprising: receiving, by processing circuitry located within a housing of the medical device, sensed signals, wherein the sensed signals comprise: bioelectrical signals received by sensing circuitry via one or more electrodes of a plurality of electrodes on an implantable lead coupled to the implantable medical device, wherein the lead is configured to be implanted such that the electrodes are proximal to a spinal cord of a patient; and signals indicative of patient posture and patient activity information from one or more accelerometers located within the housing of the implantable medical device; controlling, by the processing circuitry, the stimulation generation circuitry to deliver electrical stimulation therapy to a patient: controlling, by the processing circuitry, the stimulation generation circuitry to output an impedance measurement signal interleaved with the electrical stimulation therapy; receiving, by the processing circuitry, bioelectrical signals via selected electrodes of the plurality of electrodes indicating an impedance between the selected electrodes, determining, by the processing circuitry, respiration of the patient based on the indicated impedance; and responsive to determining the respiration of the patient, determining, by the processing circuitry, a patient state based on the determined respiration, and the posture and activity information of the patient, responsive to determining the patient state, selecting an action, wherein the selected action comprises one or more of: storing collected information, uploading the collected information to an external computing device, and outputting an electronic signal comprising an alert; and performing the selected action.

Example 67: The method of example 66, wherein the patient state comprises a sleep apnea episode, and wherein the outputting electronic signal from the implantable medical device is configured to wake the patient.

Example 68: The method of any of examples 66 and 67, further comprising responsive to determining the patient state the selected action comprises adjusting the electrical stimulation therapy to the patient.

Example 69: The method of example 68, wherein outputting the electronic signal comprises controlling the stimulation generation circuitry to deliver a control pulse configured to elicit an evoked compound action potentials (ECAP) signal perceptible to the patient as the alert.

Example 70: The method of any of examples 66 through 69, further comprising: receiving, by the processing circuitry, sensor data related to the patient state from one or more sensors external to the device, and determining the patient state based on: the received sensor data from the one or more sensors external to the device; and the determined respiration, and the posture and activity information of the patient from the one or more accelerometers.

Example 71: The method of any of examples 66 through 70, further comprising: receiving, by the processing circuitry, bioelectrical signals via electrodes of the plurality of electrodes, interleaved with the electrical stimulation therapy, indicating a cardiac rhythm of the patient; and determining, by the processing circuitry, the patient state based on the indicated cardiac rhythm of the patient, as well as based on the determined respiration, and posture and activity information of the patient.

Example 72: The method of any of examples 66 through 71, wherein the selected action comprises uploading collected information for a sleep study to an external computing device.

Example 73: The method of any of examples 66 through 72, wherein the selected action comprises collected information for a mobility study to an external computing device.

Various examples of the disclosure have been described. These and other examples are within the scope of the following claims.

What is claimed is:

1. An implantable medical device, the device comprising:
  a memory configured to store sensed signals;
  one or more sensor configured to determine posture and activity information of a patient for storage as part of the sensed signals;
  stimulation circuitry configured to deliver electrical stimulation to the patient via a first set of a plurality of electrodes configured to be implanted proximal to a spinal cord of the patient;
  sensing circuitry configured to sense bioelectrical signals via a second set of electrodes for storage as part of the sensed signals; and
  processing circuitry operably coupled to the memory, the processing circuitry configured to:
    receive the sensed signals, wherein the received sensed signals comprise:
      the bioelectrical signals sensed via the second set of plurality of electrodes, and
      the posture and activity information determined by the one or more sensor, wherein the sensed signals are indicative of a focus of a patient on an activity;
    determine whether the patient would perceive pain or would perceive paresthesia from stimulation based on the sensed signals indicative of the focus of the patient on the activity; and
    responsive to determining that the patient would not perceive pain or would not perceive paresthesia from stimulation, control the stimulation circuitry to decrease or increase the electrical stimulation to the patient.

2. The device of claim 1, wherein the processing circuitry is configured to analyze the sensed signals and based on the analyzed signals, determine for the patient: a respiration rate, cardiac rhythm, and biological impedance.

3. The device of claim 1, wherein the one or more sensors comprise any one or more of: accelerometers, gyroscopes, global positioning sensors, magnetometers, or other position and movement sensors.

4. The device of claim 1, wherein the processing circuitry is configured to:
  in response to determining that the patient would not perceive pain or would not perceive paresthesia from stimulation, control the stimulation circuitry to increase the electrical stimulation to the patient by controlling the stimulation circuitry to output a control pulse that elicits an ECAP response.

5. The device of claim 1, wherein the processing circuitry is further configured to determine whether the patient would perceive pain or would perceive paresthesia from stimulation based at least in part on a time of day.

6. The device of claim 1, wherein the received the sensed signals comprise signals from sensors external to the device.

7. The device of claim 1, wherein, the processing circuitry is configured to:
responsive to determining that the patient would not perceive pain or would not perceive paresthesia from stimulation, control the stimulation circuitry to decrease the electrical stimulation to the patient by controlling the stimulation circuitry to reduce output power of the electrical stimulation.

8. The device of claim 1, wherein an implantable lead coupled to the implantable medical device comprises:
the first set of a plurality of electrodes; and
the second set of electrodes, wherein the second set of electrodes are configured to be implanted such that the electrodes are proximal to a spinal cord of a patient.

9. A system comprising:
an implantable lead comprising a plurality of electrodes, the lead configured to be implanted proximal to a spinal cord of a patient; and
an implantable medical device, the device comprising:
a memory configured to store sensed signals;
one or more sensor configured to determine posture and activity information of the patient for storage as part of the sensed signals;
stimulation circuitry configured to deliver electrical stimulation to the patient via one or more electrodes of the plurality of electrodes; and
processing circuitry operably coupled to the memory, the processing circuitry configured to:
receive the sensed signals, wherein the received sensed signals comprise:
bioelectrical signals sensed via one or more electrodes of the plurality of electrodes, and
posture and activity information determined by the one or more sensor, wherein the sensed signals are indicative of a focus of the patient on an activity;
determine whether the patient would perceive pain or would perceive paresthesia from stimulation based on the received sensed signals indicative of the focus of the patient on the activity; and
responsive to determining that the patient would not perceive pain or would not perceive paresthesia from stimulation, control the stimulation circuitry to increase or decrease the electrical stimulation to the patient.

10. The system of claim 9, wherein the processing circuitry is configured to analyze the sensed signals and based on the analyzed signals determine for the patient: a respiration rate, cardiac rhythm, and biological impedance.

11. The system of claim 9, wherein, the processing circuitry is configured to:
in response to determining that the patient would not perceive pain or would not perceive paresthesia from stimulation, the processing circuitry is configured to control the stimulation circuitry to increase the electrical stimulation to the patient by controlling the stimulation circuitry to output a control pulse that elicits an ECAP response.

12. The system of claim 9, wherein the processing circuitry is configured to determine a patient occupation with the activity based on the received sensed signals.

13. The system of claim 9, wherein the received the sensed signals comprise signals from external sensors.

14. The system of claim 9, wherein, the processing circuitry is configured to:
responsive to determining that the patient would not perceive pain or would not perceive paresthesia from stimulation, the processing circuitry is configured to control the stimulation circuitry to decrease the electrical stimulation to the patient by controlling the stimulation circuitry to reduce output power of the electrical stimulation.

15. A method for operating an implantable medical device, the method comprising:
receiving, by processing circuitry located within a housing of the medical device, sensed signals of a patient indicative of a focus of a patient on an activity, wherein the sensed signals comprise:
bioelectrical signals received by sensing circuitry via one or more electrodes of a plurality of electrodes on an implantable lead coupled to the implantable medical device, the lead configured to be implanted such that the plurality of electrodes is proximal to a spinal cord of a patient; and
signals indicative of patient posture and patient activity information from one or more sensor located within the housing of the implantable medical device;
determining, by the processing circuitry, whether the patient would perceive pain or would perceive paresthesia from stimulation based on the sensed signals indicative of the focus of the patient on the activity;
responsive to determining that the patient would not perceive pain or would not perceive paresthesia from stimulation, controlling, by the processing circuitry, stimulation circuitry to increase or decrease electrical stimulation to the patient, wherein the stimulation circuitry is configured to deliver electrical stimulation to the patient via the plurality of electrodes.

16. The method of claim 15, further comprising, determining for the patient: a respiration rate, cardiac rhythm, and biological impedance based on analyzing the bioelectrical signals received via the one or more electrodes.

17. The method of claim 15, further comprising:
in response to determining that the patient would not perceive pain or would not perceive paresthesia from stimulation, controlling, by the processing circuitry, the stimulation circuitry to increase the electrical stimulation to the patient by controlling the stimulation circuitry to output a control pulse that elicits an ECAP response.

18. The method of claim 15, further comprising, determining, by the processing circuitry, the focus of the patient on the activity based on the received sensed signals.

19. The method of claim 15, wherein the received the sensed signals further comprise signals from sensors external to the medical device.

20. The method of claim 15, further comprising:
responsive to determining that the patient would not perceive pain or would not perceive paresthesia from stimulation, controlling, by the processing circuitry, the stimulation circuitry to decrease the electrical stimulation to the patient by controlling the stimulation circuitry to reduce output power of the electrical stimulation.

* * * * *